US009888278B2

(12) United States Patent
Phillips et al.

(10) Patent No.: US 9,888,278 B2
(45) Date of Patent: Feb. 6, 2018

(54) BANDWIDTH AND ABR VIDEO QOE MANAGEMENT BASED ON OTT VIDEO PROVIDERS AND DEVICES

(71) Applicant: TELEFONAKTIEBOLAGET LM ERICSSON (PUBL), Stockholm (SE)

(72) Inventors: Chris Phillips, Hartwell, GA (US); Robert Hammond Forsman, Sugar Hill, GA (US); Jennifer Ann Reynolds, Duluth, GA (US); Vishal Changrani, Duluth, GA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/437,134

(22) Filed: Feb. 20, 2017

(65) Prior Publication Data
US 2018/0014051 A1    Jan. 11, 2018

Related U.S. Application Data

(60) Provisional application No. 62/359,388, filed on Jul. 7, 2016, provisional application No. 62/359,402, filed
(Continued)

(51) Int. Cl.
*H04N 7/173*    (2011.01)
*H04N 21/2662*    (2011.01)
(Continued)

(52) U.S. Cl.
CPC ......... *H04N 21/2662* (2013.01); *H04L 67/02* (2013.01); *H04N 21/2396* (2013.01);
(Continued)

(58) Field of Classification Search
CPC .......... H04N 21/2662; H04N 21/2407; H04N 21/2543; H04N 21/2402; H04N 21/2396
(Continued)

(56) References Cited

U.S. PATENT DOCUMENTS 7,873,074 B1    1/2011  Boland
8,041,808 B1   10/2011  Becker
(Continued)

FOREIGN PATENT DOCUMENTS

WO    WO 2013/191963 A1    12/2013
WO    WO 2015/038277 A1     3/2015
(Continued)

*Primary Examiner* — Michael B Pierorazio

(57) ABSTRACT

An Adaptive Bitrate (ABR) Quality of Experience (QoE) Management Unit manages bandwidth usage and QoE at a customer premises where multiple client devices independently download content from multiple providers. An overall virtual pipe to the premises includes a Hypertext Transfer Protocol (HTTP) inner pipe, a non-HTTP inner pipe, an ABR inner pipe, and a non-ABR inner pipe. The Unit determines a data cap for a current billing cycle; and determines, based on policy management settings and the data cap for the current billing cycle, at least one of: a bandwidth cap for the overall virtual pipe, a bandwidth cap for the HTTP inner pipe, a bandwidth cap for the non-HTTP inner pipe, a bandwidth cap for the ABR inner pipe, and a bandwidth cap for the non-ABR inner pipe. Responsive to the determination of the bandwidth caps, the Unit throttles traffic within at least one of the inner pipes.

20 Claims, 19 Drawing Sheets

Related U.S. Application Data on Jul. 7, 2016, provisional application No. 62/373,496, filed on Aug. 11, 2016.

(51) Int. Cl.
  *H04L 29/08* (2006.01)
  *H04N 21/24* (2011.01)
  *H04N 21/239* (2011.01)
  *H04N 21/2543* (2011.01)

(52) U.S. Cl.
  CPC ..... *H04N 21/2402* (2013.01); *H04N 21/2407* (2013.01); *H04N 21/2543* (2013.01)

(58) Field of Classification Search
  USPC ........................................................ 725/116
  See application file for complete search history.

(56) References Cited

U.S. PATENT DOCUMENTS

| | | | |
|---|---|---|---|
| 8,681,614 B1 | 3/2014 | McCanne et al. | |
| 9,264,508 B2* | 2/2016 | Wolf | H04L 67/2842 |
| 9,628,405 B2* | 4/2017 | Dasher | H04L 47/801 |
| 2002/0023168 A1 | 2/2002 | Bass et al. | |
| 2008/0037420 A1* | 2/2008 | Tang | H04L 1/1607 370/229 |
| 2011/0188439 A1* | 8/2011 | Mao | H04N 7/17318 370/312 |
| 2014/0280764 A1 | 9/2014 | Dasher et al. | |
| 2014/0281002 A1 | 9/2014 | Sun | |
| 2014/0282777 A1* | 9/2014 | Gonder | H04L 65/605 725/109 |
| 2015/0249623 A1 | 9/2015 | Phillips et al. | |
| 2015/0334150 A1 | 11/2015 | Dasher et al. | |

FOREIGN PATENT DOCUMENTS

| | | |
|---|---|---|
| WO | WO 2015/155679 A1 | 10/2015 |
| WO | WO 2016/128890 A1 | 8/2016 |

* cited by examiner

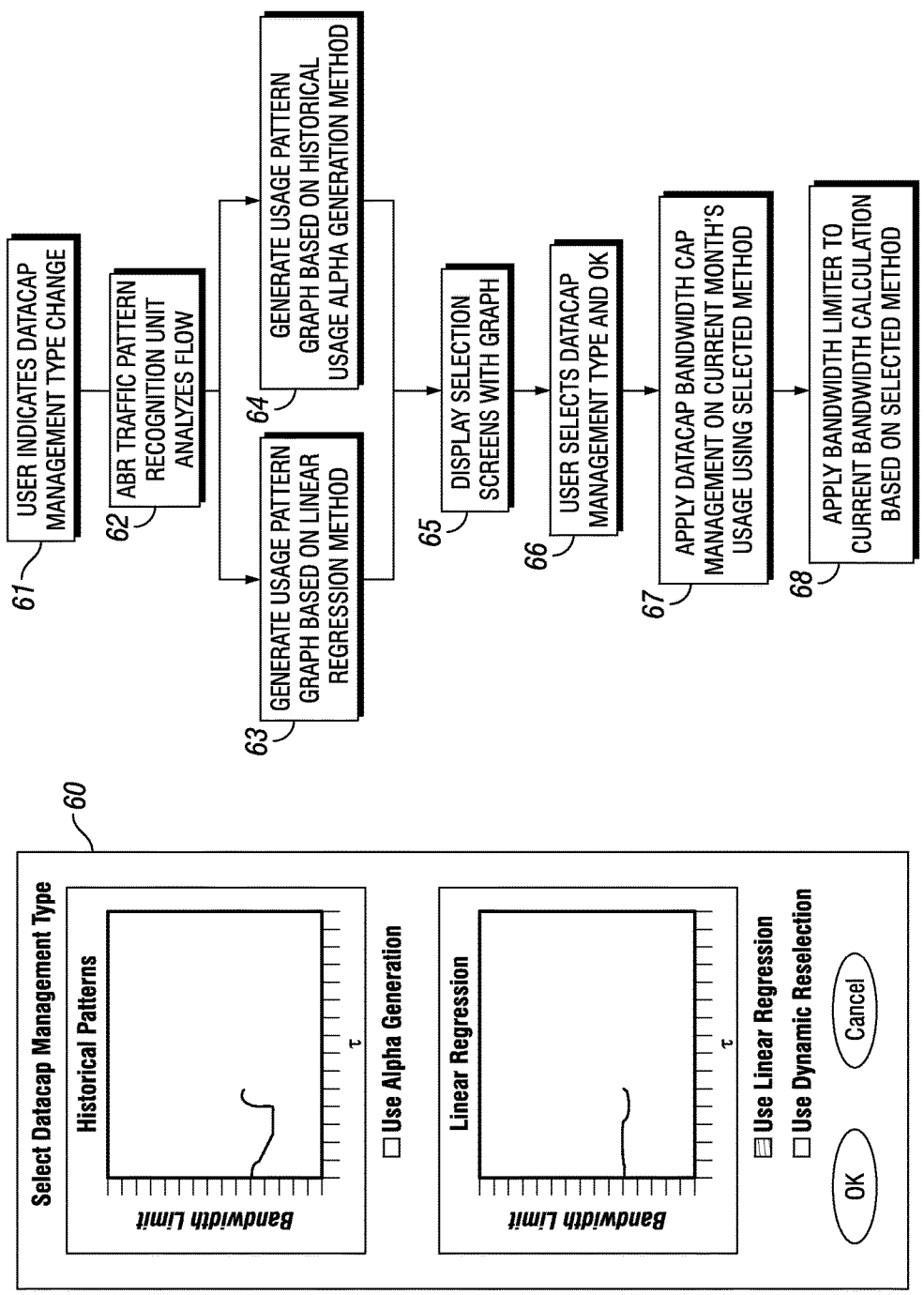

176.105568058049 + Match (Month)
- "Jan" → -64.2028557551370
- "Feb" → -53.9627109151920
- "Mar" → -33.7397386510890
- "Apr" → -23.9354498980571
- "May" → -5.79975522784770
- "Jun" → -3.75831039340120
- "Jul" → 10.8160788033725
- "Aug" → 15.8243616151036
- "Sep" → 26.1400877542043
- "Oct" → 35.7971442448627
- "Nov" → 48.2206404139593
- "Dec" → 48.6005570917365

+ Match (Day)
- "Fri" → -112.769932538520
- "Mon" → -62.4298653303430
- "Sat" → 232.352202599090
- "Sun" → -137.324793006014
- "Thu" → -77.9229816763210
- "Tue" → -52.4223104070320
- "Wed" → -64.1349056528870

+ Match (Holiday)
- 1 → -262.953330027297
- 0 → 0

FIG. 8

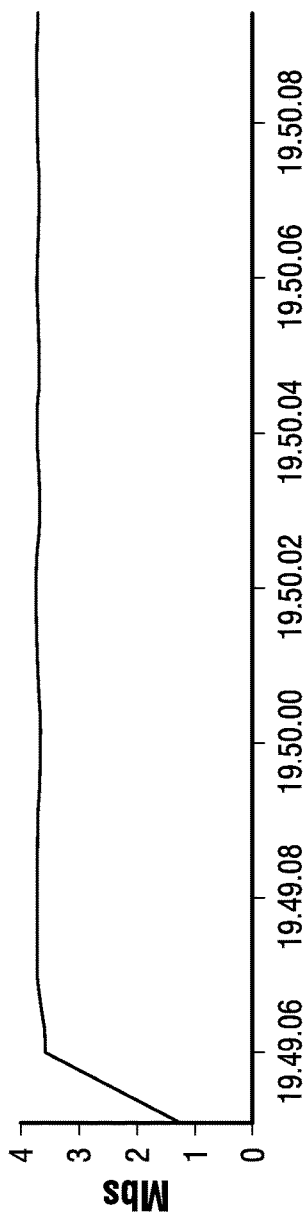
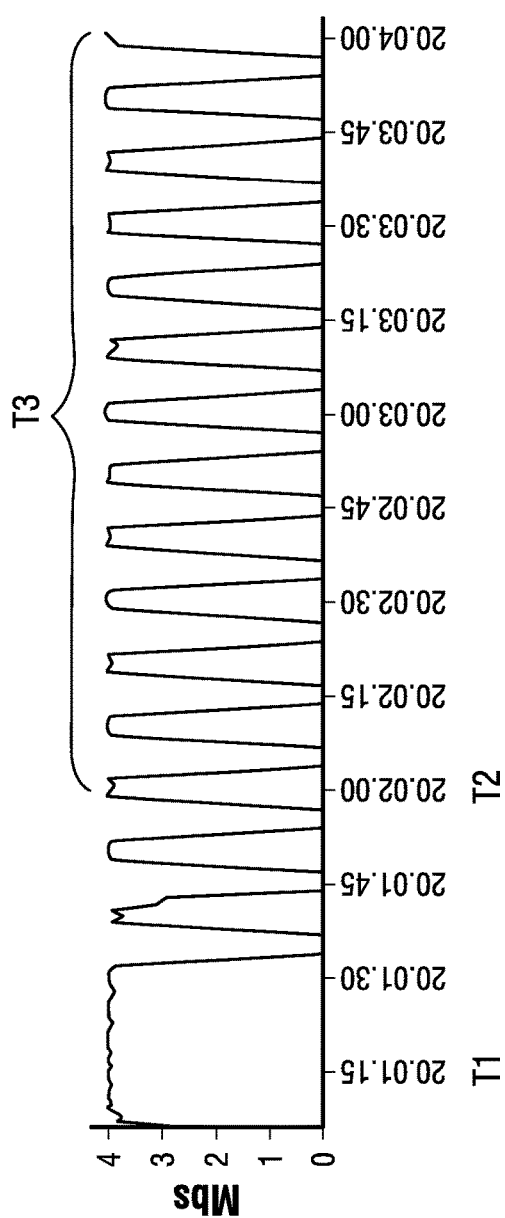

BANDWIDTH AND ABR VIDEO QOE MANAGEMENT BASED ON OTT VIDEO PROVIDERS AND DEVICES

RELATED APPLICATIONS

This application claims the benefit of U.S. Provisional Application No. 62/373,496 filed Aug. 11, 2016, U.S. Provisional Application No. 62/359,402 filed Jul. 7, 2016, and U.S. Provisional Application No. 62/359,388 filed Jul. 7, 2016, the disclosures of which are fully incorporated herein by reference.

TECHNICAL FIELD

The present disclosure relates to video distribution systems, and more particularly to a method, apparatus, and computer program product for controlling delivery of data to a plurality of client devices at a premises while maintaining desired Quality of Experience (QoE) for each client device and remaining within a data cap without excessive data throttling.

BACKGROUND

Global Internet traffic has experienced dramatic growth in recent years. Video has been a major contributor to this growth and will continue to dominate the traffic on the networks. This trend is the result of the increase in the popularity of devices like smartphones, tablets, gaming devices and smart TVs for accessing Over-The-Top (OTT) video content. In addition to Quality of Service (QoS), operators are now expected to provide video services to these devices with the same Quality of Experience (QoE) that the consumers with traditional TV services are accustomed to. It should be noted that QoS metrics capture objective and system-related characteristics, such as latency, throughput, and the like, while QoE metrics are typically subjective and user-oriented, such as consistent video quality. QoS focuses on the performance of the network while QoE focuses on the end users' experience of a service.

Adaptive bitrate (ABR) video has become the primary delivery means for consumers watching video over the Internet. ABR streaming is a technology for streaming multimedia over computer networks. It adjusts video stream quality in real time by detecting the user's available bandwidth throughout the video session. In ABR, the source content is compressed at multiple bit rates. Each bit rate stream is then partitioned into multiple segments and stored in the server. The stream set has a designated segment duration (typically between 2 and 10 seconds) and is divided into uniform segments accordingly. Upon a GET request, the streaming client is provided a manifest file with the available bit rate streams and the segments of the streams. The client, depending on implementation, selects the video rate that is most appropriate for its needs based on network conditions. In addition to maximizing QoE by minimizing video pauses due to buffering issues when watching video over an unmanaged network, ABR attempts to provide a good viewing experience to users to all devices.

Most adaptive streaming technologies are built for transmission over HTTP/TCP/IP. This is due to the fact that, firstly, Hypertext Transfer Protocol (HTTP) is a connectionless protocol; meaning it does not maintain a fixed link between the source and the destination for the entire duration of the session. Secondly, HTTP traffic can easily traverse through firewalls and Network Address Translation (NAT) in the Internet. Thirdly, HTTP works well with standard transparent caching and Content Delivery Networks (CDNs), making it much more scalable than Real-time Transport Protocol (RTP).

Traditional HTTP and non-HTTP clients that run on devices in a home network compete with each other for bandwidth consumption. An ABR client considers central processing unit (CPU) usage and network latency, but a decision for choosing a specific bit rate is still made by the ABR client in isolation without considering the impact of the decision on other streams of data flowing through a network pipe.

Bandwidth decisions made in isolation result in deterioration of the Quality of Experience (QoE) for the end users, especially jitter sensitive consumption of data such as audio and video. Low QoE means that there is no guarantee that the video quality remains consistent. For example, a device that is downloading content at 8 Mbps and watching content at 1080p at any instant may experience network congestion and lower its download bit rate to 2.5 Mbps, thereby degrading the quality of the video to, for example, 480p. Upon improvement of the network state, the device will shift back to a higher bit rate and hence a better video quality. Such frequent switching of video quality causes poor QoE.

Some existing systems attempt to manage QoE and bandwidth by generating a custom manifest based on bandwidth or devices. However, suboptimal client behavior of flushing and reloading segments results in a lot of wasted bandwidth and inconsistency in video QoE. Additionally, bandwidth contention causes inaccurate client models of available bandwidth resulting in suboptimal bitrate selection. It is important to note that with ABR streaming, the encoded video bit rate and the delivery bit rate over the network are not the same. Thus, the manifest does not control the bandwidth delivery of each segment.

There are also some custom players from video providers which attempt to exchange information when both players are attempting to watch content from the same OTT provider.

Traffic management in routers is controlled based on the traffic class. HTTP traffic can be assigned a priority classification and UDP traffic can have another priority classification.

Another issue is that many network providers implement a "data cap", which limits the amount of data a user may consume, penalty free, over a period of time (for example, a month). Another issue that arises from consumption of data from a provider (Digital Subscriber Line (DSL), Data Over Cable Service Interface Specification (DOCSIS), or others) is due to contemporary pricing models, which penalize users whose consumption of data exceeds the data cap limit during a user's billing cycle. The penalty is generally a surcharge imposed and/or a severe bandwidth throttle that is applied by the provider on the user. If the user consumes more data than the cap allows, the provider may cut them off entirely from data, throttle their data to a very slow level, or impose exorbitant charges for overages. Existing technology lets users use data as fast as they want until they are suddenly cut off, throttled, or hit with an exorbitant charge.

Adaptive video bitrate (ABR) algorithms exacerbate this problem by balancing the bitrate (or quality of the video) with the current network conditions, with the goal of having the highest bitrate video possible. There is a need to address all of the above issues in a holistic solution.

SUMMARY

Research in ABR streaming has proven that attempting to control bandwidth or QoE with ABR video does nothing to improve bandwidth management and QoE on a congested link with two or more devices attempting to watch video.

In order to properly manage the QoE and bandwidth for ABR video, management must go down to the flow level. Since ABR video is delivered over http/https, there are no router implementations which improve ABR bandwidth management and QoE. In addition, in nearly all cases, ABR video is encrypted, so deep packet inspection algorithms are not good for determining ABR traffic.

There are no known QoE/bandwidth management systems that allow a user to set a desired QoE level based on an OTT content provider. Today many people subscribe to multiple OTT providers, and family members in a household may be watching content from multiple OTT providers at the same time. This can have a major impact on the bandwidth as well as create a poor QoE for each of the users attempting to watch video.

The present disclosure describes an ABR QoE Management Unit, which may be implemented in an OTT Gateway, home Wi-Fi router, or cable modem at the customer premises. The unit manages ABR QoE across OTT providers as well as across a multitude of OTT devices inside the home. The unit assigns a priority for each OTT provider and for each OTT device. The priorities translate into weights which are used by Weighted Fair Queuing (WFQing) bandwidth management systems (plain, phantom, or mixed).

The disclosed ABR QoE Management Unit may be implemented in a custom over-the-top (OTT) gateway, consumer grade home Wi-Fi router, or cable modem at the customer premises. The unit may also be implemented in a Virtual Residential Gateway (vRGW), Broadband Network Gateway (BNG), or virtual instance just prior to a BNG.

In one embodiment, the present disclosure is directed to a method in a computer-controlled ABR QoE Management Unit for managing bandwidth usage and QoE at a customer premises where multiple client devices independently download content from multiple providers. The method includes determining a data cap for a current billing cycle day; and determining, based on policy management settings and the data cap for the current billing cycle day, at least one of: a premises bandwidth cap for an overall virtual pipe to the premises, the overall virtual pipe including a Hypertext Transfer Protocol (HTTP) inner pipe, a non-HTTP inner pipe, an ABR inner pipe, and a non-ABR inner pipe; an HTTP bandwidth cap for the HTTP inner pipe; a non-HTTP bandwidth cap for the non-HTTP inner pipe; an ABR bandwidth cap for the ABR inner pipe; and a non-ABR bandwidth cap for the non-ABR inner pipe. Responsive to the determination of the bandwidth caps, the ABR QoE Management Unit throttles traffic within at least one of the inner pipes.

In another embodiment, the present disclosure is directed to an ABR QoE Management Unit for managing bandwidth usage and QoE at a customer premises where multiple client devices independently download content from multiple providers. The ABR QoE Management Unit includes at least one microprocessor; and a non-transitory computer-readable medium coupled to the at least one microprocessor configured to store computer-readable instructions, wherein when the instructions are executed by the at least one microprocessor, the ABR QoE Management Unit is caused to determine a data cap for a current billing cycle day; and determine, based on policy management settings and the data cap for the current billing cycle day, at least one of: a premises bandwidth cap for an overall virtual pipe to the premises, the overall virtual pipe including a Hypertext Transfer Protocol (HTTP) inner pipe, a non-HTTP inner pipe, an ABR inner pipe, and a non-ABR inner pipe; an HTTP bandwidth cap for the HTTP inner pipe; a non-HTTP bandwidth cap for the non-HTTP inner pipe; an ABR bandwidth cap for the ABR inner pipe; and a non-ABR bandwidth cap for the non-ABR inner pipe. The ABR QoE Management Unit is also caused to throttle traffic within at least one of the inner pipes, responsive to the determination of the bandwidth caps.

In another embodiment, the present disclosure is directed to a computer program product comprising instructions stored on non-transient computer-readable medium which, when executed by a processor, cause an ABR QoE Management Unit to manage bandwidth usage and QoE at a customer premises where multiple client devices independently download content from multiple providers, by performing the acts of: determining a data cap for a current billing cycle day; and determining, based on policy management settings and the data cap for the current billing cycle day, at least one of: a premises bandwidth cap for an overall virtual pipe to the premises, the overall virtual pipe including a Hypertext Transfer Protocol (HTTP) inner pipe, a non-HTTP inner pipe, an ABR inner pipe, and a non-ABR inner pipe; an HTTP bandwidth cap for the HTTP inner pipe; a non-HTTP bandwidth cap for the non-HTTP inner pipe; an ABR bandwidth cap for the ABR inner pipe; and a non-ABR bandwidth cap for the non-ABR inner pipe. Responsive to the determination of the bandwidth caps, the ABR QoE Management Unit is caused to throttle traffic within at least one of the inner pipes.

The disclosed ABR QoE Management Unit provides a way to manage overall bandwidth usage inside a home. However it is primarily focused on providing the ability to manage ABR QoE across OTT providers as well as across the multitude of OTT devices inside the home.

The disclosed ABR QoE Management Unit is network neutrality friendly in that it allows the subscriber to control their own choices of which provider gets high quality versus others when multiple devices inside the home are attempting to watch OTT video delivered from multiple OTT providers at the same time.

The disclosed ABR QoE Management Unit benefits end users because it allows them to have much better control over their network usage. In particular it generates a much better QoE when multiple people inside the same home are attempting to watch OTT video.

BRIEF DESCRIPTION OF THE DRAWINGS

In the following section, the invention will be described with reference to exemplary embodiments illustrated in the figures, in which:

FIG. 4 illustrates an exemplary display providing a user with the capability to select between the historical usage alpha (a) generation method or the linear regression method of data cap management;

FIG. 5 is a flow chart of a method of selecting and using a Datacap management type in accordance with an exemplary embodiment of the present disclosure;

FIG. 8 shows a predicted daily model by linear regression (least square method);

FIGS. 11A-11B are network usage graphs showing a generic (plain) WFQ algorithm and its impact on a non-ABR data download and an ABR video playout, respectively;

DETAILED DESCRIPTION

Figure 1:
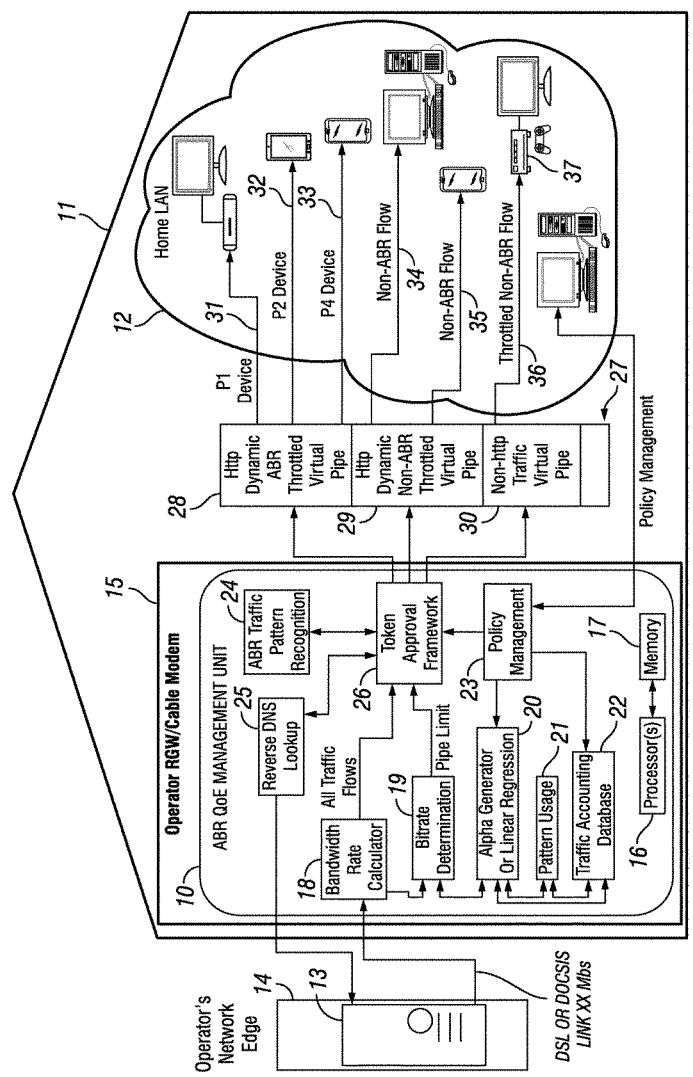
FIG. 1 is a simplified block diagram of an exemplary embodiment of the disclosed ABR QoE Management Unit implemented in a home or other premises.

The disclosed system will now be described more fully hereinafter with reference to the accompanying drawings, in which preferred embodiments of the system are shown. This invention may, however, be embodied in many different forms and should not be construed as limited to the embodiments set forth herein; rather, these embodiments are provided so that this disclosure will be thorough and complete, and will fully convey the scope of the assembly to those skilled in the art. In the drawings, like reference signs refer to like elements.

FIG. 1 is a simplified block diagram of a first exemplary embodiment of the disclosed ABR QoE Management Unit 10 implemented in a home or other premises 11 containing a plurality of client devices, which may be connected to a Home Local Area Network (LAN) 12. Data may reach the home from a service provider's gateway 13 in an operator's network 14 via, for example, a Digital Subscriber Line (DSL) or Data Over Cable Service Interface Specification (DOCSIS) link. The service provider's gateway may be, for example a Digital Subscriber Line Access Multiplexer (DSLAM) or a Cable Modem Termination System (CMTS). The DSLAM is a network device that receives signals from multiple DSL connections and places the signals on a high-speed backbone connection using multiplexing techniques. The CMTS is a device, typically located in a cable company's headend or hubsite, which is used to provide high speed data services (e.g., cable internet, or voice over IP (VoIP)) to cable subscribers.

The ABR QoE Management Unit 10 may be implemented, for example, in an operator supplied cable modem or residential gateway (RGW) 15, in an OTT provider supplied GW, in a consumer grade home Wi-Fi router, or the like. The ABR QoE Management Unit may include a number of units controlled by a processing circuit comprising one or more processors 16 executing computer program instructions stored on a memory 17. The units may include a bandwidth rate calculator 18 (specifically for DOCSIS links), a datacap bandwidth bitrate determination unit 19, an Alpha generator with history simulation or linear regression 20, a historical pattern usage unit 21, an all traffic accounting database for the current billing cycle 22, a policy management unit 23, an ABR traffic pattern recognition unit 24 (as in U.S. Patent Application Publication No. 2016/0277299 entitled System and Method for Categorizing Packet Flows in a Network) incorporated by reference herein, a reverse DNS lookup unit 25, and a framework for mixed managed and best-effort token approval 26. Since bandwidth is shared in a DOCSIS network, and bandwidth is advertised as up to xx Mbs vs guaranteed xx Mbs in Digital Subscriber Line (DSL) networks, the size of the premises bandwidth pipe can change drastically over time based on the consecutive data usage across the service group(s).

The ABR QoE Management Unit 10 includes an outer virtual pipe 27 sized the same as the physical pipe (same size as the Internet pipe). Within the outer virtual pipe are nested virtual pipes 28-30. The outer virtual pipe carries both http traffic (ABR and non-ABR) and non-http traffic. Thus, inside the outer pipe there are an http dynamic ABR throttled virtual pipe 28, an http dynamic non-ABR throttled virtual pipe 29, and a non-http traffic virtual pipe 30. The http dynamic ABR throttled virtual pipe 28 may be additionally divided into inner virtual pipes 31-33, which may use Phantom Packet Transmission (PPT) WFQ to allow weighting at the pipe level. Each OTT provider may be assigned to an inner virtual pipe. PPT WFQ is applied to each of the flows inside the pipe, which allows for weighting/setting a priority based on the corresponding user device and OTT provider. The http dynamic non-ABR throttled virtual pipe 29 allows for devices to be weighted as well using Plain WFQ such as in flows 34 and 35. The non-http traffic virtual pipe 30 may provide throttled best effort data in a stream flow 36 to devices such as a game console 37.

When a virtual pipe is not in use, its bandwidth can be shared with other virtual pipes. Since the vast majority of traffic today is either http or https, only flows to the user devices in those pipes are managed by a bandwidth management technique. Hence, non-http traffic flows are best effort. PPT WFQ is described in U.S. Pat. No. 9,467,387 entitled System and Method for Managing Bandwidth Responsive to the Duty Cycle of an ABR Client and U.S. Patent Application Publication No. 2016/0234126 entitled System and Method for Managing Bandwidth Responsive to the Duty Cycle of an ABR Client, both of which are incorporated by reference herein. PPT WFQ enables non-ABR video traffic to use the available bandwidth inside the http pipe at any point in time. For ABR video sessions, the rate is locked per session, preventing the ABR device from constantly changing bit rates and resolution/quality based on the duty cycles of other ABR devices. The only time the rate changes is based on when another ABR session is terminated. In U.S. Pat. No. 9,467,387 and U.S. Patent Application Publication No. 2016/0234126, all http flows are inside the same virtual pipe, and ABR video sessions are allocated bandwidth differently than non-ABR http sessions. In one aspect, the present disclosure expands on these previous publications in that the ABR device duty cycle bandwidth is now shared from the ABR Video virtual pipe to the non-ABR http pipe.

Figure 2:
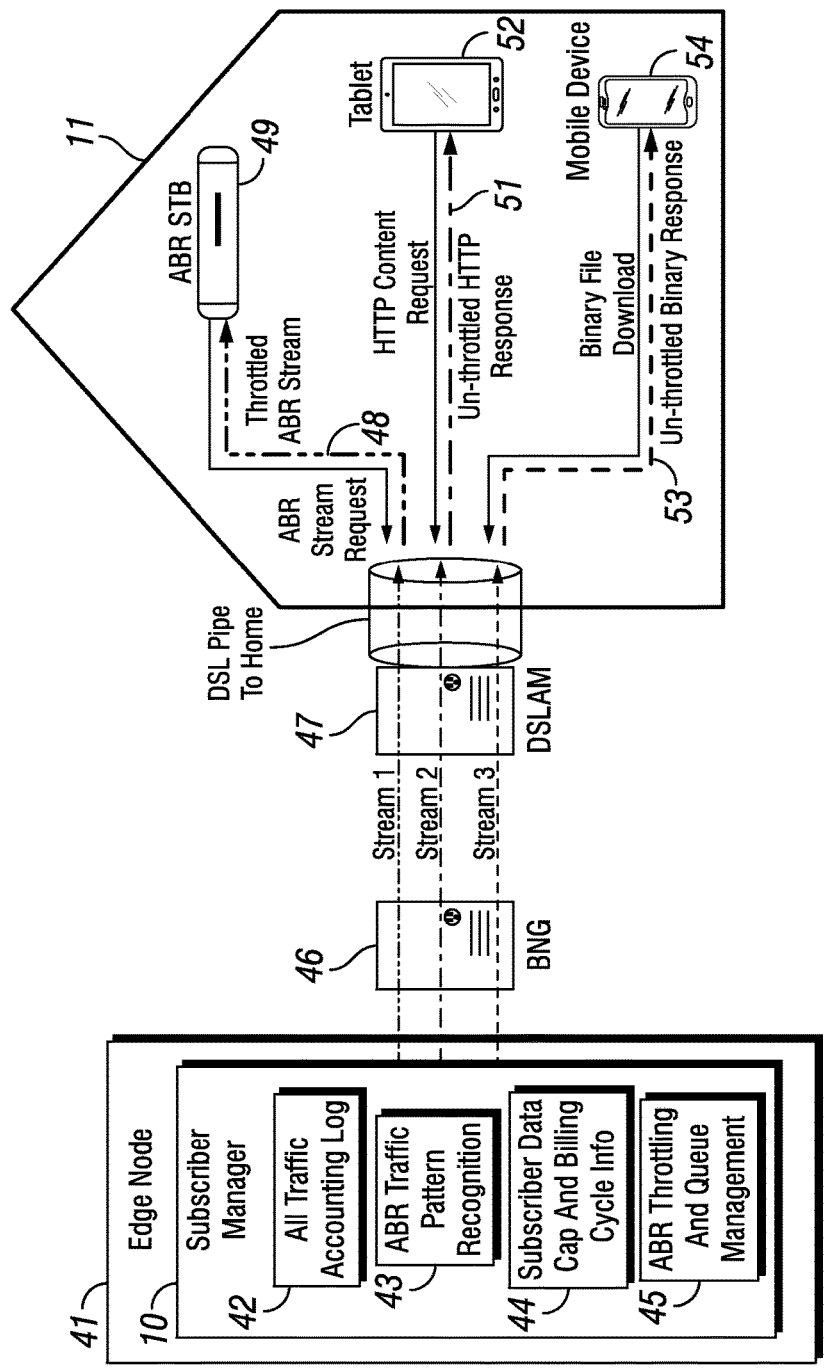
FIG. 2 is a simplified block diagram of a second exemplary embodiment of the disclosed ABR QoE Management Unit implemented in a home or other premises.

FIG. 2 is a simplified block diagram of a second exemplary embodiment of the disclosed ABR QoE Management Unit 10. In this embodiment, a provider's edge node 41 implements the ABR QoE Management Unit 10 (subscriber manager), which further includes an all traffic accounting log 42, an ABR traffic pattern recognition module 43, a subscriber data cap and billing cycle information module 44, and an ABR throttling and queue management module 45.

In particular, FIG. 2 illustrates an implementation of the unit in a DSL network edge. FIG. 2 illustrates an example in which the subscriber manager 10 is implemented as a virtual instance immediately upstream of a Broadband Network Gateway (BNG) 46. This implementation could also be inside a vRGW instance or inside of the BNG, for example. The basic functionality of the subscriber manager is the same as the ABR QoE Management Unit 10 in FIG. 1. The various virtual pipes carry the data flows to the home or other premises 11 through, for example, a DSLAM 47. In the illustrated example, a throttled ABR stream 48 is directed to an ABR Set Top Box (STB) 49; an un-throttled HTTP response 51 is directed to a tablet computer 52; and an un-throttled binary file response 53 is directed to a mobile device 54.

Figure 3:
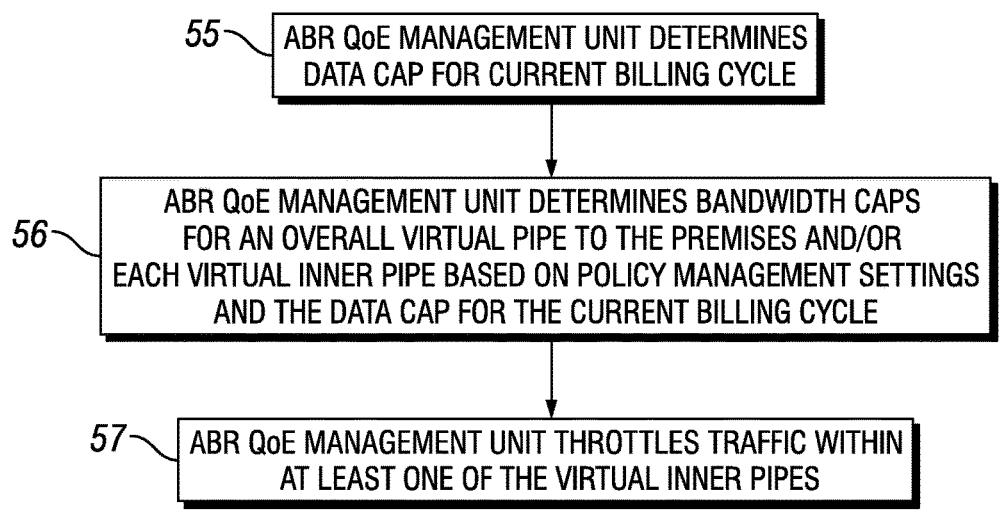
FIG. 3 is a flow chart of an overall method of managing bandwidth usage and QoE at a customer premises in an exemplary embodiment of the present disclosure.

FIG. 3 is a flow chart of an overall method of managing bandwidth usage and QoE at a customer premises in an exemplary embodiment of the present disclosure. The method may be performed in a computer-controlled ABR QoE Management Unit 10, which manages bandwidth usage and QoE at a customer premises where multiple client devices independently download content from multiple providers. An overall virtual pipe to the premises includes a Hypertext Transfer Protocol (HTTP) inner pipe, a non-HTTP inner pipe, an ABR inner pipe, and a non-ABR inner pipe. At step 55, the ABR QoE Management Unit determines a data cap for a current billing cycle day. At step 56, the ABR QoE Management Unit determines, based on policy management settings and the data cap for the current billing cycle day, bandwidth caps for the overall virtual pipe to the premises and/or each virtual inner pipe. Thus, the ABR QoE Management Unit determines at least one of: a premises bandwidth cap for the overall virtual pipe to the premises; an HTTP bandwidth cap for the HTTP inner pipe; a non-HTTP bandwidth cap for the non-HTTP inner pipe; an ABR bandwidth cap for the ABR inner pipe; and a non-ABR bandwidth cap for the non-ABR inner pipe. At step 57, the ABR QoE Management Unit throttles traffic within at least one of the inner pipes responsive to the determination of the bandwidth caps.

Thus, the datacap limiting calculation is used to manage the size of the overall virtual pipe to the premises. The overall virtual pipe may be the same size as the physical pipe. However, when datacap management is being enforced, the overall virtual pipe will be sized such that 0<overall virtual pipe size<=physical data pipe size. Of course, the overall virtual pipe size dynamically changes based on the data usage over time throughout the billing cycle.

In some cases, only the ABR pipe size will be changing. In this case, however, since all flows are managed in the pipe with the exception of the other traffic, it is simpler to adjust the overall virtual pipe size. All inner pipes are proportionally resized, and the flows are managed based on the policies and methods described below. The flows are handled dynamically and automatically based on the overall virtual pipe changing sizes as determined by the datacap calculations.

FIG. 4 illustrates an exemplary user interface display 60 providing a user with the capability to select between the historical usage alpha (a) generation method or the linear regression method of data cap management. Alternatively, the user may select dynamic reselection between the two methods. In this case, the ABR QoE Management Unit 10 automatically recognizes the best method to use based on changes over time. For example, the unit may examine the changes over a time period such as the last 1-5 days and automatically switch to the method offering the minimal changes over the time period.

FIG. 5 is a flow chart of a method of selecting and using a Datacap management type in accordance with an exemplary embodiment of the present disclosure. At step 61, a user indicates that a change of Datacap management type is desired. At step 62 the ABR Traffic Pattern Recognition unit 24, 43 analyzes the data flow. At step 63, the ABR QoE Management Unit 10 generates a usage pattern graph based on the linear regression method. At step 64, the ABR QoE Management Unit generates a usage pattern graph based on the historical usage alpha generation method. At step 65 the user interface displays the selection screen as shown in FIG. 4. At step 66, the user selects the desired Datacap management type and selects "OK". At step 67, the ABR QoE Management Unit applies Datacap bandwidth management on the current month's usage using the selected method. At step 68 a bandwidth limiter is applied to a current calculation of allowed bandwidth based on the selected method.

Figures 6A, 6B, 6C:
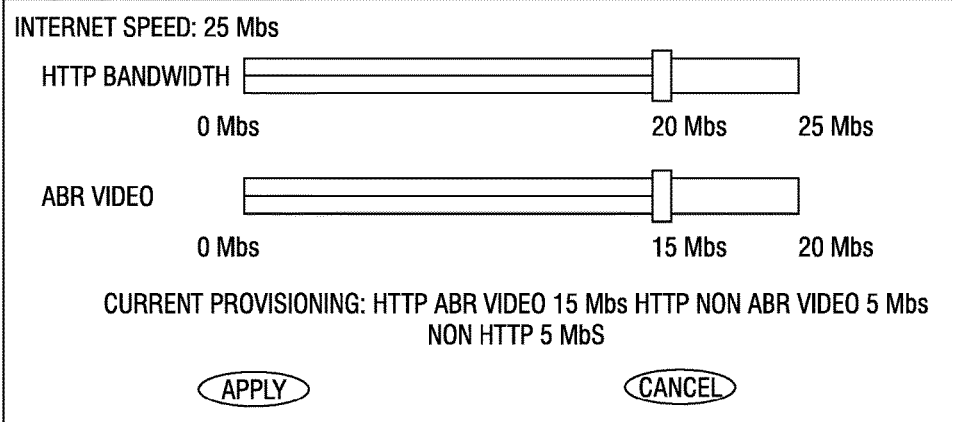
FIGS. 6A-6C show exemplary embodiments of Pipe Bandwidth Provisioning, OTT Provider Priority Policy Management, and Device Priority Policy Management, respectively, in the disclosed system.

FIGS. 6A-6C show exemplary embodiments of user interfaces for provisioning pipe bandwidth, setting priorities for OTT providers, and setting priorities for client devices, respectively, in the disclosed system.

FIG. 6A shows an exemplary embodiment of a user interface for provisioning pipe bandwidth. The outer virtual pipe 27 is sized to the Internet pipe size of 25 Mbs. An http virtual pipe is provisioned for 20 Mbs. Within the http virtual pipe, the http dynamic ABR throttled virtual pipe 28 is provisioned for 15 Mbs. This leaves 5 Mbs for the http dynamic non-ABR throttled virtual pipe 29 and 5 Mbs for the non-http traffic virtual pipe 30.

FIG. 6B provides examples for assigning a priority level (from Priority 1 to Priority 4 in this example) for each OTT provider.

FIG. 6C provides examples for assigning a priority level (from Priority 1 to Priority 4 in this example) for each client device. Ultimately, the priority translates into a weight, which is used by the Weighted Fair Queuing (WFQ) bandwidth systems discussed below. Example priority-to-weight translations may be Priority 1=weight of 3.0; Priority 2=weight of 1.5; Priority 3=weight of 0.75; and Priority 4=weight of 0.375. These device weights are used in both ABR video traffic flows as well as non-ABR video traffic flows. Non-http flows remain best effort.

Linear Regression Method

In statistics, linear regression is an approach for modeling the relationship between a scalar dependent variable y and one or more explanatory variables (or independent variables) denoted x. The data cap management method disclosed herein is accomplished by analyzing past (historic) data usage of a household to predict what the future data usage will be and then applying appropriate bandwidth throttling to keep the ABR data usage under the cap. This problem of predicting future data usage from past usage information lends itself aptly to linear regression. The dependent variable for regression, y, in this case is the prediction of the future data usage, and the independent variables are past hourly data usage, daily data usage, and monthly data usage.

There are certain inherent patterns of hourly, daily, and monthly data usage of any individual or household. For example, weekday data usage in the evening between 6:00 pm to 10:00 pm (prime time) is very high as compared to data usage during other times of the day. This, however, changes during weekends. Overall, weekend data consumption is generally higher than weekday consumption. Similarly, monthly consumption also changes throughout the year and may be affected by the geographical location of the user. There are also certain special days (e.g., holidays) such as the 4th of July, Thanksgiving, Christmas, and the like when data usage may spike. The linear regression model attempts to provide an equation of the "best-fit" line which passes through all the data points. The model factors into account this variance in data usage and can fairly predict data usage for a given hour, day or month of a year.

In an embodiment of the disclosure, a linear regression model is generated for each household given its past data usage. The model is not static and is continuously improved by closing a feedback loop and updating the model by recalculating the coefficients as more recent data becomes available. The present disclosure considers only a simple linear regression model using the ordinary least square method, although more complex models may be envisioned within the scope of the invention.

Based on the input variables, an exemplary embodiment of the disclosure generates two different models—a daily linear regression model and an hourly linear regression model.

The daily linear regression model uses the past daily data usage and past monthly data usage as the independent variables and predicts usage for a given day. This predicted usage can then be divided by 24 to get hourly data usage assuming uniform data consumption during the day. The hourly regression model goes one step further and also takes into account the past hourly data usage as an independent variable. Thus the hourly model additionally factors in the variance in data usage during the course of the day.

Figure 7:
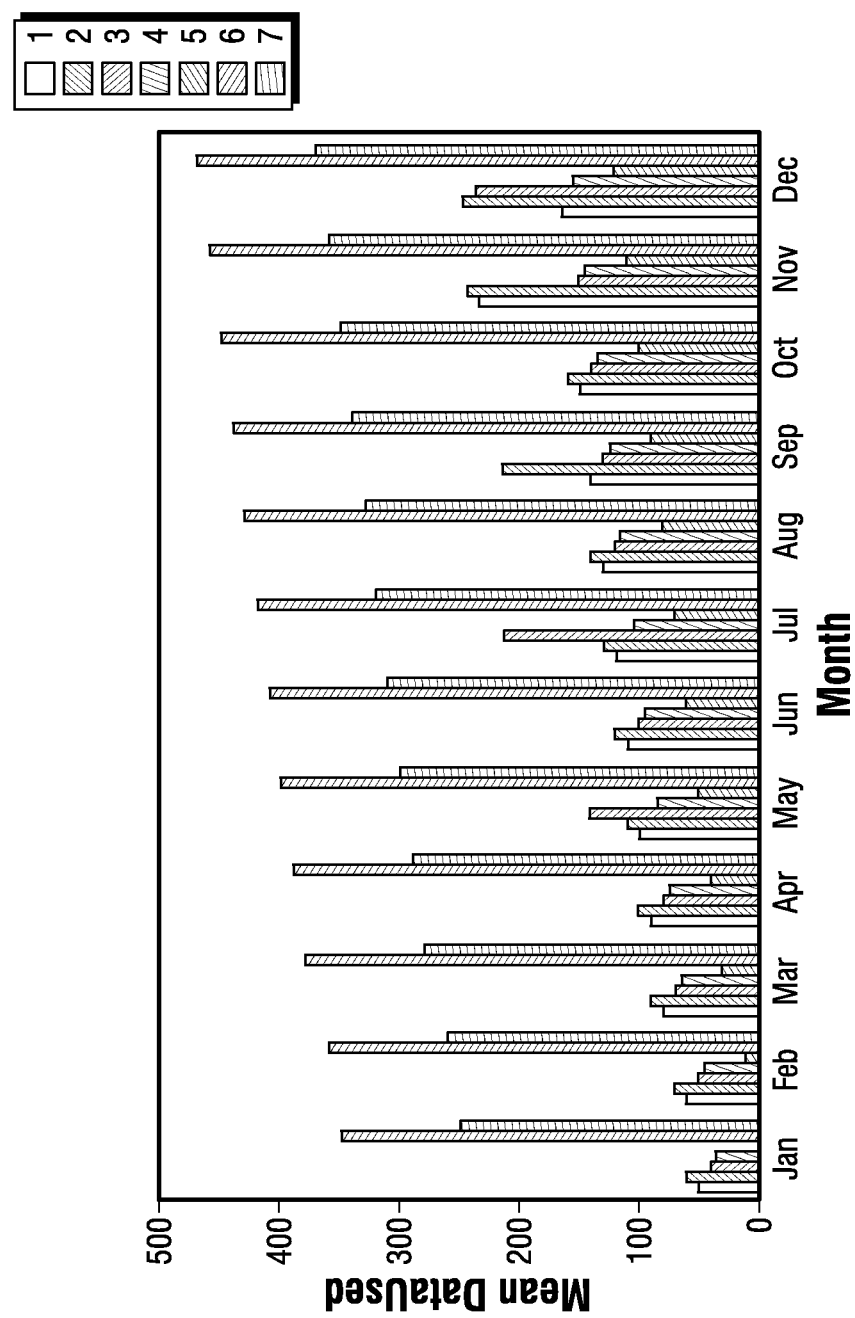
FIG. 7 is a graph of data usage as a function of the month of the year, further broken down by total data usage for the day of the week within each month.

FIG. 7 is a graph of data usage as a function of the month of the year, further broken down by total data usage for the day of the week within each month. In this data set, all data usage on the Mondays within a given month is reflected in the first bar shown for the given month; all data usage on the Tuesdays within a given month is reflected in the second bar shown for the given month; and so on. A linear regression model can be generated from this data. The model captures the cyclic trend of data consumption in the days of a week and the increasing trend between months of the year. The model also factors in whether a given day is a holiday (other than a weekend).

FIG. 8 shows a predicted daily model by linear regression (least square method). The Match( ) function is a lookup function for the coefficient value such that if the month of interest is January, the Match(Month) function returns the coefficient −64.2028. If the month of interest is February, the Match(Month) function returns the coefficient −53.9627, and so on. The same process is used for the Match(Day) function for the day of the week and the Match(Holiday) function for regular days or holidays. If the day is a holiday, for example, the Holiday value is 1. Otherwise, the value 0 is used for a regular day.

By way of example, if the day of interest is January $2^{nd}$, and it is a Saturday and not a holiday, the model can predict data usage for that day by using a beginning value of 176.1055, the coefficient for the month as −64.2028 (January), the coefficient for the day (Saturday) as 232.3522, and the coefficient for a Holiday (not a holiday) as 0.

Therefore, predicted data usage is calculated as:

$$176.1055-64.2028+232.3522+0=344.2549 \text{ MB}.$$

To get the predicted hourly data usage, the daily data usage is divided by 24. Therefore, hourly data usage is 344.2549/24=14.3439 MB.

Weighted Fair Queuing (WFQ)

WFQ algorithms enable the fraction of link capacity that will be allocated to each flow to be specified. Each household and client gets its weighted share of the bandwidth over time without a control plane having to adjust bandwidth caps. Although routers are already equipped with a WFQ algorithm, several problems arise when applying it to ABR bandwidth management:

1. Today's routers can control traffic classification. They can be configured to give http or https traffic a certain priority related to other classifications of traffic such as UDP, RTP, and FTP. Since progressive download of ABR video is delivered either by http or https, the router has no way of knowing the difference between ABR video sessions, download of OS/game patch sessions, checking of email, or just plain web surfing. Deep packet inspection could differentiate between video traffic, but both content encryption and transport encryption remove this option.

2. Even if the routers could recognize ABR video flows, they have no way of prioritizing certain streams over others. Operators, however, would prefer to apply policies to individual video sessions. Even if the encryption problem did not exist and the routers could recognize ABR video traffic, they cannot achieve the desired level of granularity that the operator would like to control.

3. The generic WFQ algorithms also cause issues with ABR video delivery due to the duty cycle and greedy nature of the ABR clients.

Figure 9:
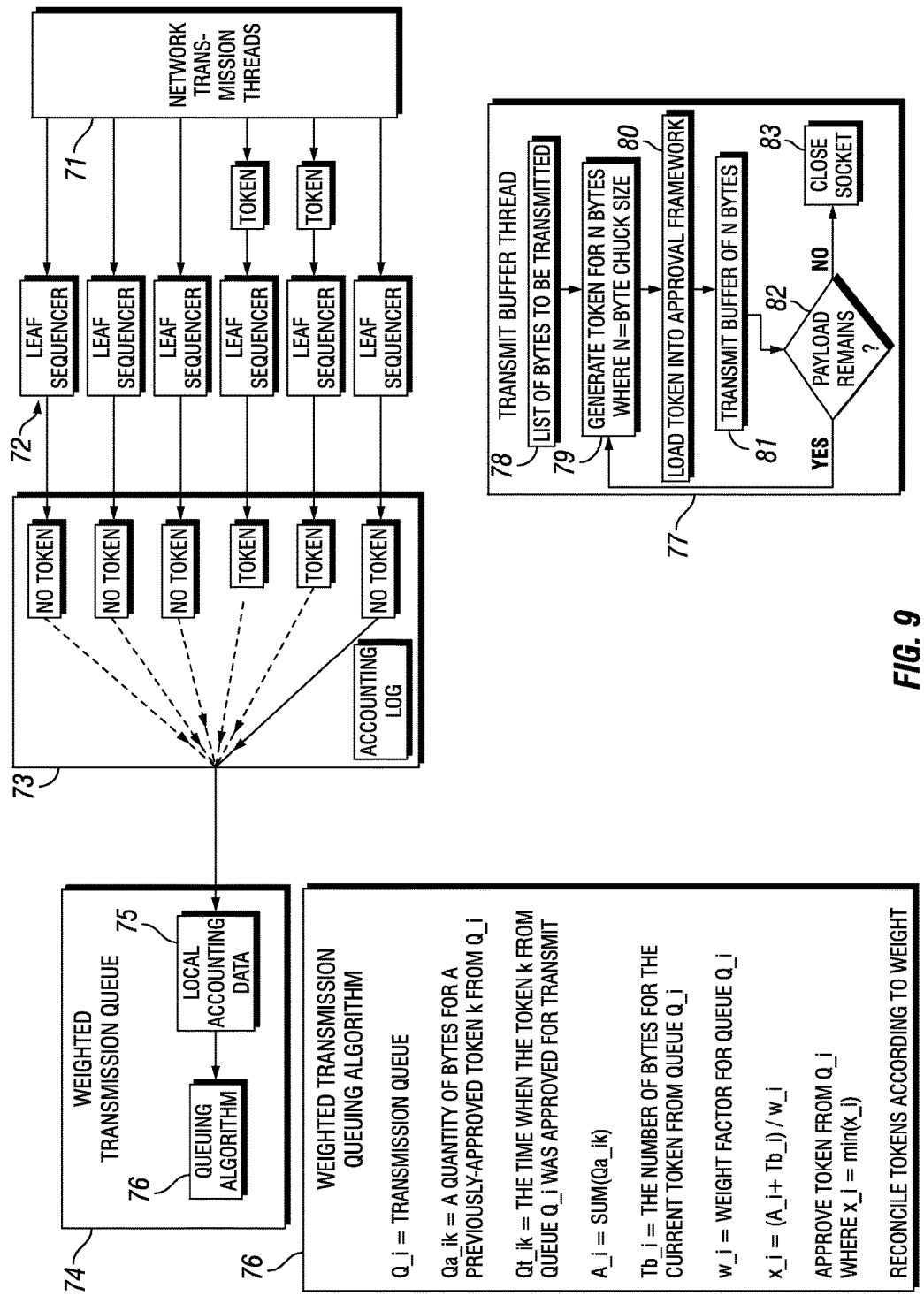
FIG. 9 shows an example of generic (plain) Weighted Fair Queuing (WFQ) for bandwidth management for non-ABR HTTP traffic flows.

FIG. 9 shows an example of generic (plain) WFQ for bandwidth management for non-ABR HTTP traffic flows. A plurality of Network Transmission Threads (NTTs) 71 associated with multiple client sessions, e.g., media streaming sessions involving one or more ABR clients, and optionally, one or more non-ABR clients, are illustratively provided, which may be stored in a suitable storage area or memory associated with the ABR QoE Management Unit 10. A plurality of leaf sequencers 72 are configured to receive transmission request tokens from one or more NTTs. In one embodiment, there may be exactly one leaf sequencer per "transmission class" of communication flows or sessions. For example, the transmission class for a leaf sequencer may be configured based on a client's IP address. That is, if one client is trying to download multiple segments, they must share the same leaf sequencer. A transmission class may also be configured based on a session ID of a communication session, flow or stream IDs, QoS level, Class of Service (CoS) level, group ID of devices, source/destination IP addresses, and the like. For example, one client may be assigned a different priority based on the type of video content. In that case, the transmission class may be identified by a session ID. In the case of data download, it could be a session ID associated with a download of data or a session ID for a particular gaming session, as an example. Accordingly, in some embodiments, leaf sequencers 62 may represent individual devices in a subscriber premises or a group of mobile devices being served by a base station for video delivery. In other embodiments, the leaf sequencers may represent on-demand video assets from various content sources, and the like.

A first stage component 73 facilitates the token selection process. In one example implementation, the queuing functionality is based on WFQing and may be configured to perform an approval process. A Weighted Transmission Queue 74 stores local accounting data 75 and applies a Weighted Transmission Queuing Algorithm 76 as shown in the box below.

An approval loop process 77 for a single thread indicates the iterative nature of the selection, arbitration, and transmission aspects of the ABR QoE Management Unit 10. The illustrative token approval loop may be iteratively executed for transmission of payload data from a plurality of NTTs corresponding to different client devices. At block 78, an NTT lists a number of bytes to be transmitted on the link. At block 79, a token is generated for a specified amount of payload data, e.g., N bytes, where N equals the byte chunk size. At block 80, the token for the thread is loaded into the hierarchical approval framework described above. At block 81, once the token is approved, the N bytes are transmitted on the link. At decision block 82, it is determined whether any payload remains to be transmitted. If not, the approval loop 77 proceeds to block 83 where the transmission socket is closed. On the other hand, if payload remains, process 77 loops back to block 79 where additional tokens may be generated for corresponding chunks of data. As noted previously, the foregoing approval loop process may take place for multiple transmit buffer threads, each submitting respective tokens to the approval framework as needed.

Plain WFQ traffic management is best for non-ABR traffic and provides for the bandwidth management of non-ABR streams. When using plain WFQ, ABR clients will often change bit rates as a result of other ABR clients sleeping due to a full buffer. When plain WFQ is used for ABR video delivery, a degraded QoE occurs.

Figure 10:
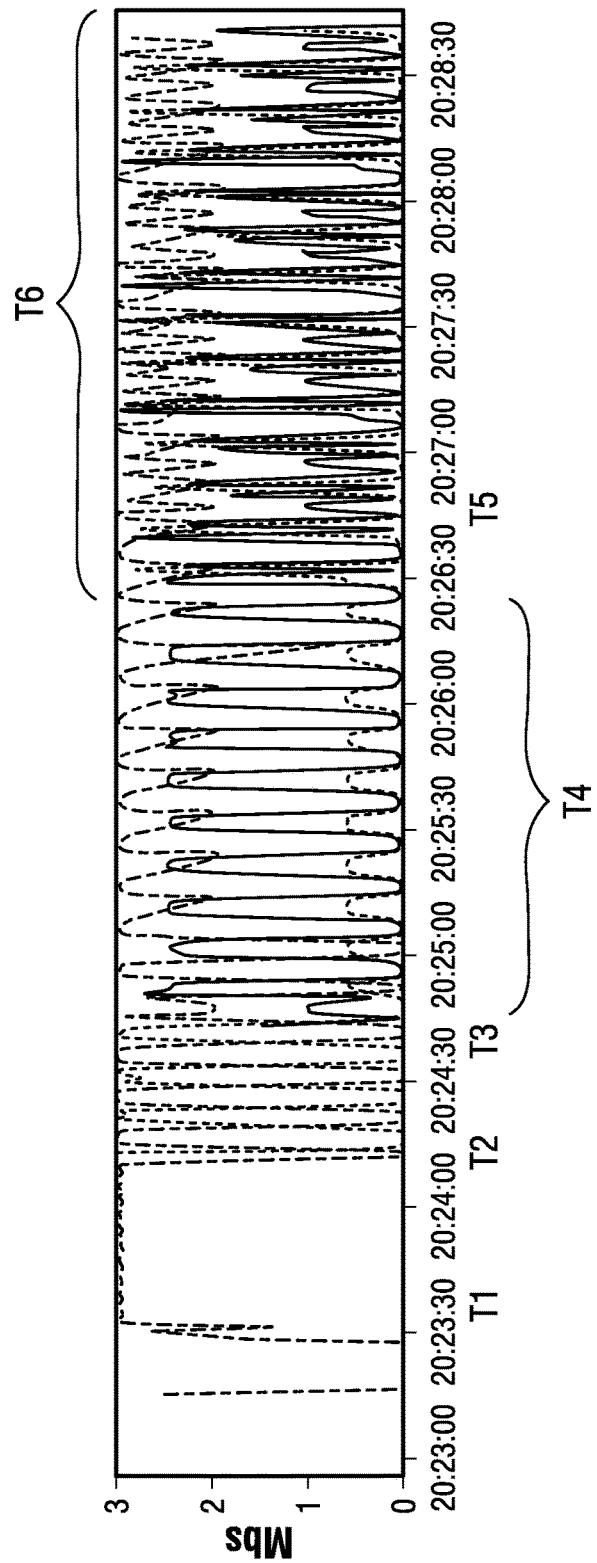
FIG. 10 is a network usage graph showing a generic (plain) WFQ algorithm and its impact on the ABR clients.

FIG. 10 is a network graph showing a generic WFQ algorithm and its impact on three ABR clients utilizing a 3 Mbs network pipe. A video manifest includes segments of 2 Mbs, 1.6 Mbs, 1.2 Mbs, 900 Kbs, 600 Kbs, and 300 Kbs. The three clients include Device-1 with a 3.0 weighting, Device-2 with a 1.5 weighting, and Device-3 with a 0.6 weighting. Generic WFQ caps the bandwidth, thus saturating the link. The problem occurs when lower weighted clients wake up from their duty cycle to pull a segment while the higher weighted clients are sleeping. This causes the lower weighted clients to periodically attempt to move up in their manifest profile and become aggressive only to get knocked down again in the future.

At time T1, the 3.0-weighted Device-1 begins playing video. Its allocated bandwidth is 3.0 Mbs and Device-1's buffer fill begins. At time T2, the 0.6-weighted Device-3 begins playing video. Allocated bandwidths are 2.5 Mbs for Device-1 and 0.4999 Mbs for Device-3. At time T3, during buffer fill, Device-3 fills the pipe while Device-1 is in its duty cycle (full buffer with 2 Mbs segments and maintaining buffer state. Device-3 pulls segments on buffer fill. Spikes in bandwidth usage should be noted. Device-1 does not saturate the pipe and WFQ is not activated while Device-1 is sleeping, thus allowing Device-3 to fully consume the pipe. Device-3 is playing an 800 Kbs profile.

During time segment T4, Device-2 joins. Allocated bandwidths are 1.68 Mbs for Device-1, 0.981 Mbs for Device-2, and 0.336 Mbs for Device-3. During Device-2's buffer fill, the pipe is always saturated by Device-2. Bandwidth allocations are correct for all three devices. At time T5, all three devices' buffers are full for correct bitrate segments based on WFQ calculations. All three devices begin their duty cycles.

During the duty cycles in time segment T6, all clients receive the full pipe at some point as a result of other clients sleeping. At times, the 0.6-weighted Device-3 gets the full pipe. At other times, the 1.5-weighted Device-2 or the 3.0-weighted Device-1 gets the full pipe. This, along with the aggressive nature of the clients results in the 0.6-weighted Device-3 moving up in bitrate, sometimes drastically, only to get knocked back down into its proper bandwidth class. This has adverse QoE effects on all ABR client sessions inside the network pipe.

Thus, with generic WFQ and ABR client duty cycle behavior, there could be times when a 1 Mbps client would get anywhere between 6 Mbps and 1 Mbps. One solution could be to hybridize WFQ and cap all of the http sessions to a fixed cap and never let those devices leave that cap. For example, assume there is a 6 Mbps pipe and three devices downloading data using the generic WFQ method. Device-1 is weighted at 3.0, Device-2 at 2.0, and Device-3 at 1.0. If all three devices are active on the link, Device-1 would get 3 Mbps, Device-2 would get 2 Mbps, and Device-3 would get 1 Mbps, regardless of the type of data they are downloading. If active ABR video sessions are always capped at their calculated bandwidth, it would smooth out the QoS for all sessions and create a consistent QoE for the end user. However, this causes a waste in other types of http/https traffic.

FIGS. 11A-11B are network graphs showing a generic WFQ algorithm and its impact on a non-ABR data download and an ABR video playout, respectively.

Referring to FIG. 11A, the network graph shows the bandwidth usage for a non-ABR data download such as downloading a large email attachment in a 4 Mbs pipe. The email download could take advantage of the free bandwidth when the ABR client is sleeping. Once the download starts, the pull of data is continuous until the download is completed. There is always link activity until the session ends or all data is downloaded.

Referring to FIG. 11B, the network graph shows the bandwidth usage for an ABR video playout in a 4 Mbs pipe. After the initial pull of ABR video data is started at T1 and the client's buffer is filled at T2, link activity goes up and down throughout the ABR active video session as shown in time interval T3. However, if all http sessions were capped based on the assumption that all http/https sessions were always active, then ABR video duty cycles would lead to bandwidth wastage in the network.

Figure 12:
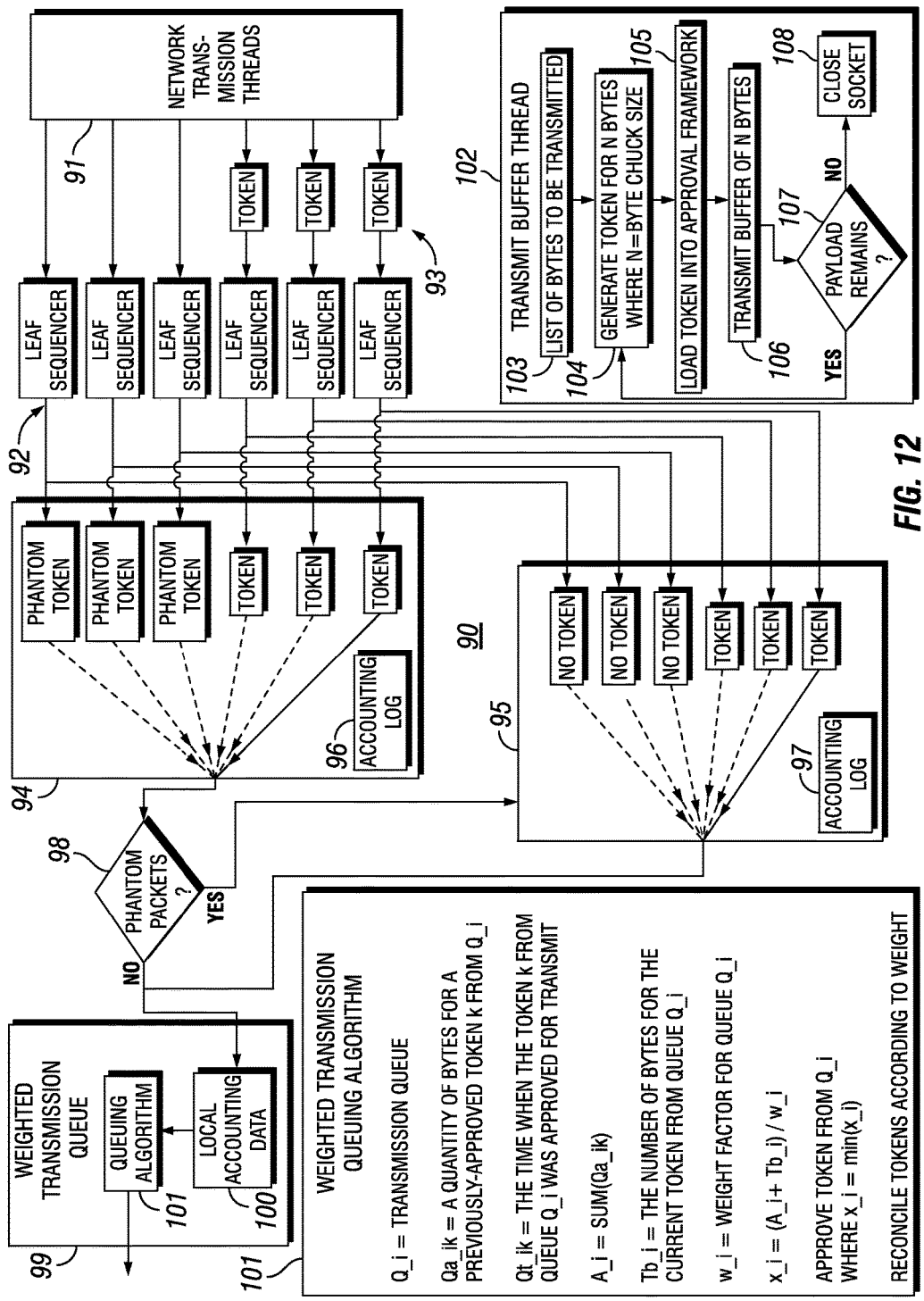
FIG. 12 shows an example of Phantom Packet Transmission (PPT) WFQ for bandwidth management for ABR HTTP traffic flows.

FIG. 12 shows an example system employing Phantom Packet Transmission (PPT) ABR optimized WFQ for bandwidth management for ABR http traffic flows. PPT overcomes the drawbacks of generic WFQ and provides the best of both worlds in which WRQ is optimized for both http ABR and non-ABR delivery. This type of traffic management is best for ABR traffic and provides for the bandwidth management of ABR streams. When a client is in the idle phase of its duty cycle, Phantom Packets are generated to simulate a continuous network demand; however, there is no transmission on the link. If the WFQ algorithm selects one of the Phantom Packets for transmission, the WFQ process does not transmit a packet to the ABR client. Instead, it selects a replacement real packet and transmits the real packet to a non-ABR client. This allows for non ABR traffic to benefit from higher bandwidth when the ABR clients are in the idle phase of their duty cycles. This requires two layers of accounting (first layer for all the traffic classes, and a second layer for all the non-ABR traffic classes) to ensure bandwidth is divided fairly. In plain WFQ ABR, clients are tricked into thinking they have extra bandwidth whenever they are pulling during the idle phase of competing clients' duty cycles. This unstable client behavior has a negative impact on bandwidth management. PPT WFQ prevents this undesirable behavior by creating a phantom load during the idle phases. This results in a more stable ABR client behavior.

The example system incorporates hierarchical token approval logic based on suitable queuing for managing bandwidth allocation and QoS of video delivery in a number of scenarios. The system may be configured to be operative at a subscriber premises or in the network, depending on the application. A hierarchical token approval logic module (TALM) 80 creates phantom tokens so as to simulate the network contention that would exist if the ABR clients were to experience no peaks and valleys of a duty cycle. In other words, the sleep phases of an ABR client's duty cycle are "masked" such that the rest of the ABR clients are "tricked" into behaving as though there is no extra bandwidth made available. Once the phantom tokens/packets have been used for bandwidth calculation, they can be replaced with real network traffic, for example non-ABR traffic, in an optional replacement stage, if any bandwidth remains that would have otherwise been used by other opportunistic ABR clients to artificially inflate their video quality.

For purposes of the present disclosure, a phantom token is a token that is not associated with any actual payload traffic of an NTT corresponding to a client's communication session. In accordance with the teachings herein, phantom tokens may be issued by leaf sequencer nodes in a nested/hierarchical WFQ arrangement when a parent node queries or polls its child sequencer node and the child sequencer node has not loaded a normal or regular token from a client session's NTT. Normally, if an NTT loads a token into an associated leaf sequencer, it is a real token or request for permission to transmit a chunk of actual payload data. If the NTT has not loaded a token into its corresponding leaf sequencer, e.g., because the client is not currently downloading a segment (i.e., sleep phase or sleep mode), then when the parent node queries the leaf sequencer of the ABR session, it will provide a phantom token to generate the illusion that the client is downloading rather than "resting" in the sleep phase of its duty cycle.

A plurality of NTTs 91 associated with multiple client sessions, e.g., media streaming sessions involving one or more ABR clients, and optionally, one or more non-ABR clients, are illustratively provided, which may be stored in a suitable storage area or memory associated with the ABR QoE Management Unit 10. A plurality of leaf sequencers 92 are configured to receive transmission request tokens 93 from one or more NTTs. In one embodiment, there may be exactly one leaf sequencer per "transmission class" of communication flows or sessions. For example, the transmission class for a leaf sequencer may be configured based on a client's IP address. That is, if one client is trying to download multiple segments, they must share the same leaf sequencer. A transmission class may also be configured based on a session ID of a communication session, flow or stream IDs, QoS level, Class of Service (CoS) level, group ID of devices, source/destination IP addresses, and the like. For example, one client may be assigned a different priority based on the type of video content. In that case, the transmission class may be identified by a session ID. In the case of data download, it could be a session ID associated with a download of data or a session ID for a particular gaming session, as an example. Accordingly, in some embodiments, leaf sequencers 92 may represent individual devices in a subscriber premises or a group of mobile devices being served by a base station for video delivery. In other embodiments, the leaf sequencers may represent on-demand video assets from various content sources, and the like.

In one arrangement, hierarchical TALM 90 may be implemented as a nested two-stage approval framework or scheme with components that may be selectively activated. A first stage component 94 is configured to receive: (i) phantom tokens from leaf sequencers servicing NTTs that correspond to one or more ABR clients in inactive phases of their respective traffic download duty cycles, (ii) regular tokens from leaf sequencers servicing NTTs that correspond to one or more ABR clients in active phases of their respective traffic download duty cycles, and/or (iii) regular tokens from leaf sequencers servicing NTTs that correspond to one or more non-ABR clients continuously pulling data for respective communication sessions. A second stage component 95 operating selectively in conjunction with the first stage component 94 is provided for receiving only regular tokens. Such regular tokens are the same regular tokens provided to the first stage component, i.e., (i) tokens from leaf sequencers servicing NTTs that correspond to one or more ABR clients in active phases of their respective traffic download duty cycles, and/or (ii) tokens from leaf sequencers servicing NTTs that correspond to one or more non-ABR clients continuously pulling data for respective communication sessions. In one variation, the structure and functionality of the first stage component 94 may be selectively inactivated via suitable feature selection control signals, e.g., from a network operator, when the functionality of utilizing phantom tokens/packets in bandwidth estimations or computations is not needed in a network. That is, the first stage component may be bypassed when inactivated, in which case only the token approval logic of the second stage component is operative for servicing the tokens emanating from the NTTs 91. Likewise, the second stage component 95 may be selectively bypassed (e.g., where are there no non-ABR clients or where bandwidth allocation to a replacement client is desired), whereby only the first stage component 94 is operative (provided it has been selected) for providing bitrate locking with respect to the ABR clients.

Because the first stage component 94 is configured to receive phantom tokens, it may be referred to as a phantom-enabled token approval stage. Likewise, the second stage component 95 may be referred to as a normal token approval stage (when operating solely) and/or replacement token approval stage (when operating in conjunction with the phantom-enabled token approval first stage). To ensure fairness at both stages of the token approval framework, each stage may be provided with its own accounting log module for reconciling tokens being submitted for selection. Accordingly, a first accounting log module 96, which may be referred to as a phantom-enabled accounting log module, and a second accounting log module 97, which may be referred to as a replacement or normal accounting log module, are provided in association with the first and second stage components 94, 95, respectively.

Since phantom tokens are provided only to the first stage component 94, the corresponding slots in the second stage component 95 indicate "no token". Regular tokens are received by both stages and are indicated as "token".

At a decision block 98, the system determines whether there are any phantom packets. If not, regular packets go into a weighted transmission queue 99, which stores local accounting data 100 and applies a Weighted Transmission Queuing Algorithm 101 as shown in the box below.

If, however, it is determined at block 98 that there are phantom packets, the system may execute the Weighted Transmission Queuing Algorithm 101 by the first stage component 94 or the second stage component 95, or both, to facilitate the token selection process depending on selective activation of the components as described above.

Typically, the hierarchical token approval process and arbitration of selected tokens for transmission queuing may be performed in multiple iterations for each NTT as long as there is payload data to be transmitted. An approval loop process 102 for a single thread is shown to indicate the iterative nature of the selection, arbitration, and transmission aspects of the system. At block 103, an NTT lists a number of bytes to be transmitted on the link. At block 104, a token is generated for a specified amount of payload data, e.g., N bytes, where N equals the byte chunk size. At block 105, the token for the thread is loaded into the hierarchical approval framework described above. At block 106, once the token is approved, the N bytes are transmitted on the link. At decision block 107, it is determined whether any payload remains to be transmitted. If not, the approval loop 102 proceeds to block 108 where the transmission socket is closed. On the other hand, if payload remains, process 102 loops back to block 104 where additional tokens may be generated for corresponding chunks of data. As noted previously, the foregoing approval loop process may take place for multiple transmit buffer threads, each submitting respective tokens to the approval framework as needed.

Figure 13:
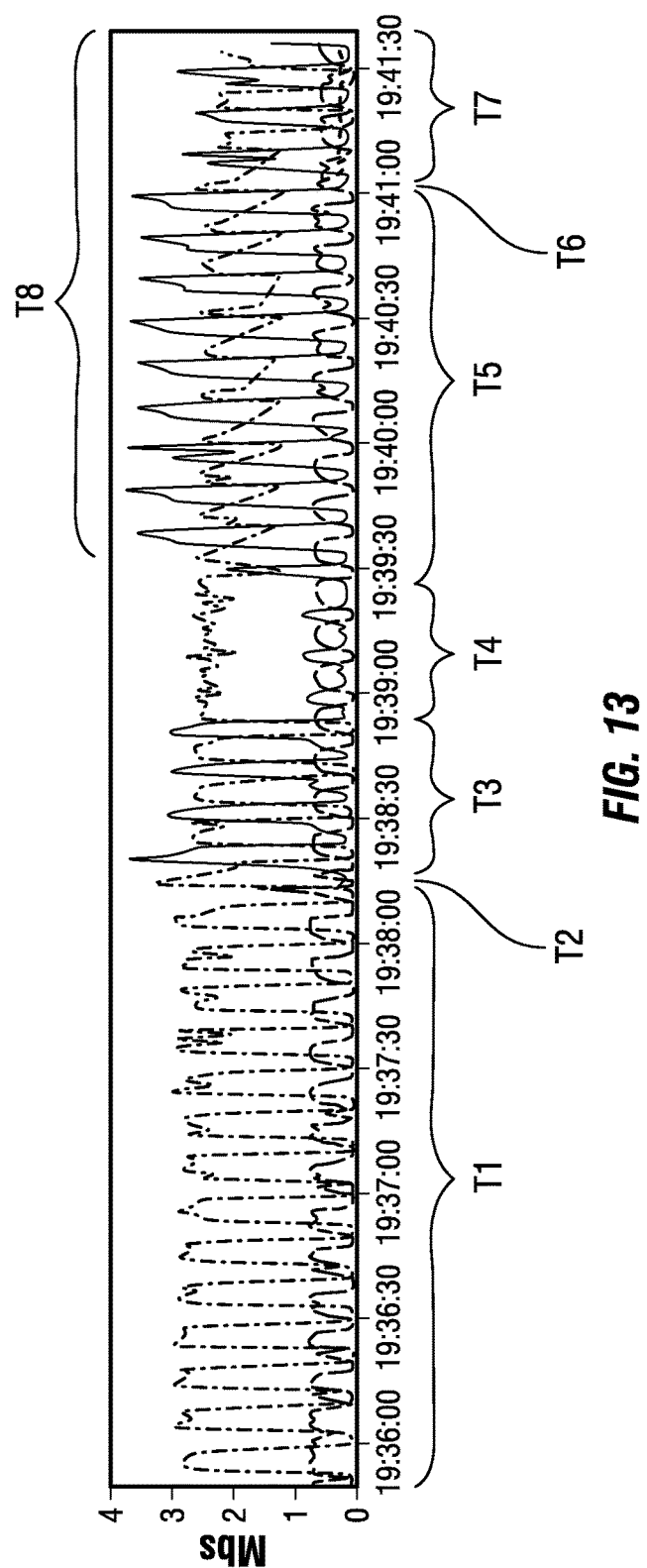
FIG. 13 is a network usage graph showing the effect of PPT WFQ on http/https data streams.

FIG. 13 is a network usage graph showing the effect of Phantom Packet Transmission (PPT) on http/https data streams in a 4 Mbs pipe. PPT overcomes the drawbacks of generic WFQ and provides superior performance. As described above, when a client is in the idle phase of its duty cycle, Phantom Packets are generated to simulate a continuous network demand. If the WFQ algorithm chooses one of the Phantom Packets for transmission, it is replaced by a packet from a non-ABR traffic class. This requires two layers of accounting—a first layer for all the traffic classes and a second layer for all the non-ABR traffic classes—to ensure bandwidth is divided fairly. In regular WFQ ABR, a client is tricked into thinking it has extra bandwidth just because it is pulling during the idle phase of its competing clients' duty cycles, but PPT prevents that by creating a phantom load during the idle phases. This results in a more stable ABR client behavior.

In the illustrated example, a video manifest includes segments of 2 Mbs, 1.6 Mbs, 1.2 Mbs, 900 Kbs, 600 Kbs, and 300 Kbs. There are three ABR clients: Device-1 with a 3.0 weighting, Device-2 with a 0.75 weighting, and Device-3 with a 0.4 weighting. There is also one non-ABR download client with a 0.175 weighting.

During time interval T1, the 3.0-weighted Device-1 and the 0.75-weighted Device-2 are playing ABR video. Device-1 is allocated 3.2 Mbs and Device-2 is allocated 0.8 Mbs. The devices never leave their allocated bitrates during their duty cycles. At time T2, the 0.175-weighted non-ABR download client joins. Bandwidth allocations are recalculated as 3.05 Mbs for Device-1, 0.764 Mbs for Device-2, and 0.178 Mbs for the non-ABR download client. Thereafter, during time interval T3, during ABR duty cycles, unused bandwidth is given to the non-ABR download client. Neither of the ABR clients is allowed bandwidth above their allocations.

During time interval T4, Device-1 forces a buffer fill as a result of jumping to another time in the video. This forces the non-ABR download client to remain in the bitrate calculation with the exception that Device-2 remains within its allocated bandwidth and continues playing the same QoS video. Device-2's unused duty cycle bandwidth is shared with the non-ABR download client.

During time interval T5, a constant QoS is maintained for all ABR video clients regardless of their duty cycles. Unused bandwidth as a result of the ABR clients' duty cycles is allocated to the non-ABR download client. Bandwidth allocations remain as 3.05 Mbs for Device-1, 0.764 Mbs for Device-2, and 0.178 Mbs for the non-ABR download client.

At time T6, ABR Device-3 joins. Bandwidth allocations are recalculated as 2.71 Mbs for Device-1, 2.75 Mbs for Device-2, 0.452 for Device-3, and 0.158 Mbs for the non-ABR download client. During time interval T7, Device-3 begins buffer fill. All ABR clients remain in their allocated bandwidths in and out of their duty cycles. The non-ABR download client receives unused bandwidth from Devices-1 and 2 that remain in their duty cycles.

During the duty cycles denoted as T8, only non-ABR clients receive the full pipe, optimizing the pipe for general data delivery as well as optimized bandwidth allocation and QoS for ABR clients.

PPT WFQ provides a number of advantages over generic WFQ, including consistency in video quality and delivery throughout the video session; well behaved ABR clients because their greedy behaviors are controlled; better utilization of network resources; improved sharing of network resources; higher bandwidth utilization; and optimization and control for non-ABR traffic flows.

Figure 14:
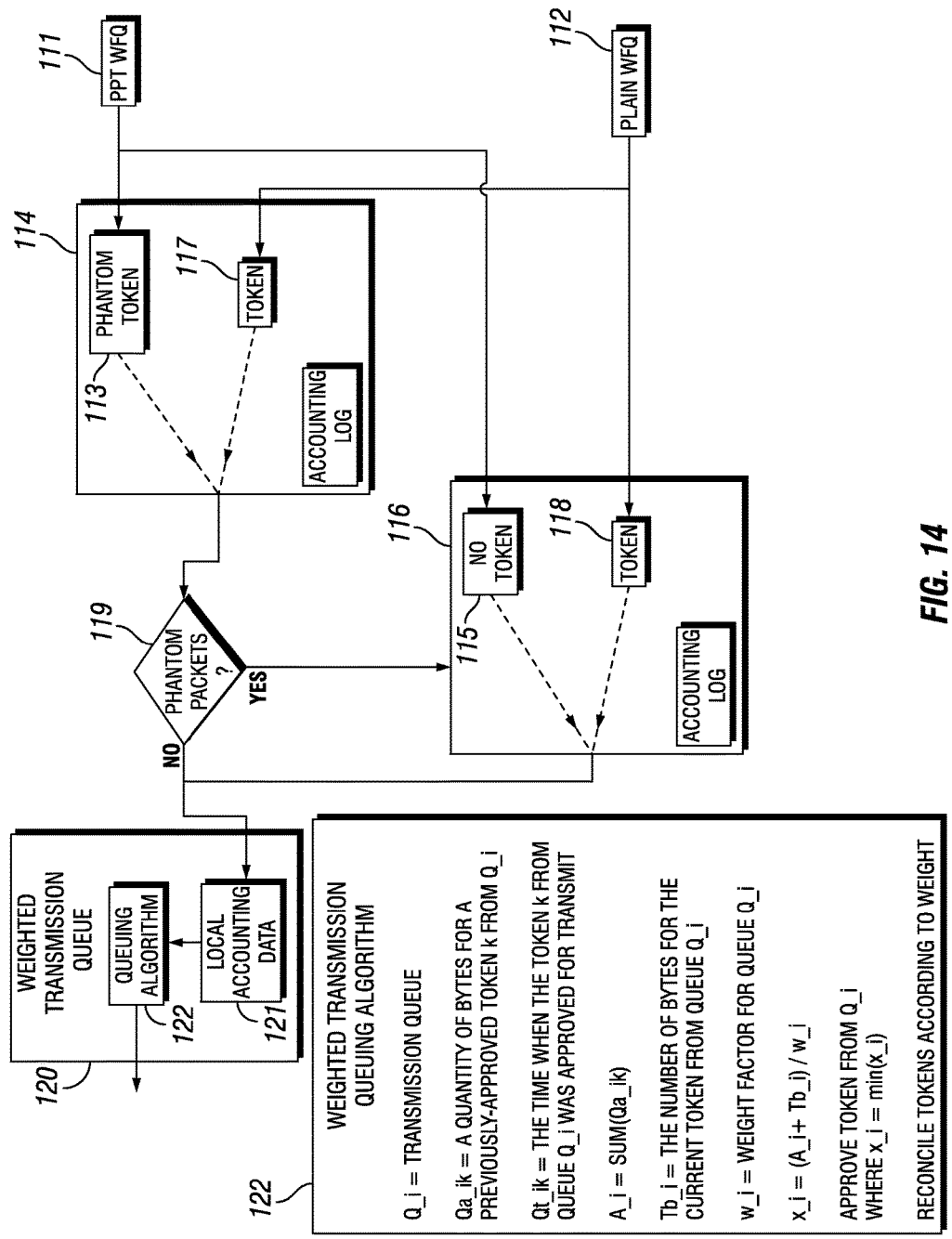
FIG. 14 shows an example of mixed PPT WFQ for bandwidth management combining ABR and non-ABR http traffic flows.

FIG. 14 shows an example of mixed Phantom WFQ for bandwidth management combining ABR and non-ABR http traffic flows. FIG. 13 is an example flow of filtering the ABR vs the non-ABR http traffic. This is an enhancement or extension of the generic/plain WFQ and PPT WFQ where ABR flows travel through the PPT WFQ flow 111 and the non-ABR flows travel through the plain WFQ flow 112. In this example, the PPT WFQ flow sends a phantom token 113 to a first stage component 114 and no token 115 to a second stage component 116. The plain WFQ flow sends a regular token 117 to the first stage component 114 and a regular token 118 to the second stage component 116. Because the first stage component 114 is configured to receive phantom tokens, it may be referred to as a phantom-enabled token approval stage. Likewise, the second stage component 116 may be referred to as a normal token approval stage.

At a decision block 119, the system determines whether there are any phantom packets. If not, regular packets go into a weighted transmission queue 120, which stores local accounting data 121 and applies a Weighted Transmission Queuing Algorithm 122 as shown in the box below.

If, however, it is determined at block 119 that there are phantom packets, the system may execute the Weighted Transmission Queuing Algorithm 122 by the first stage component 114 or the second stage component 116, or both, to facilitate the token selection process.

Figure 15:
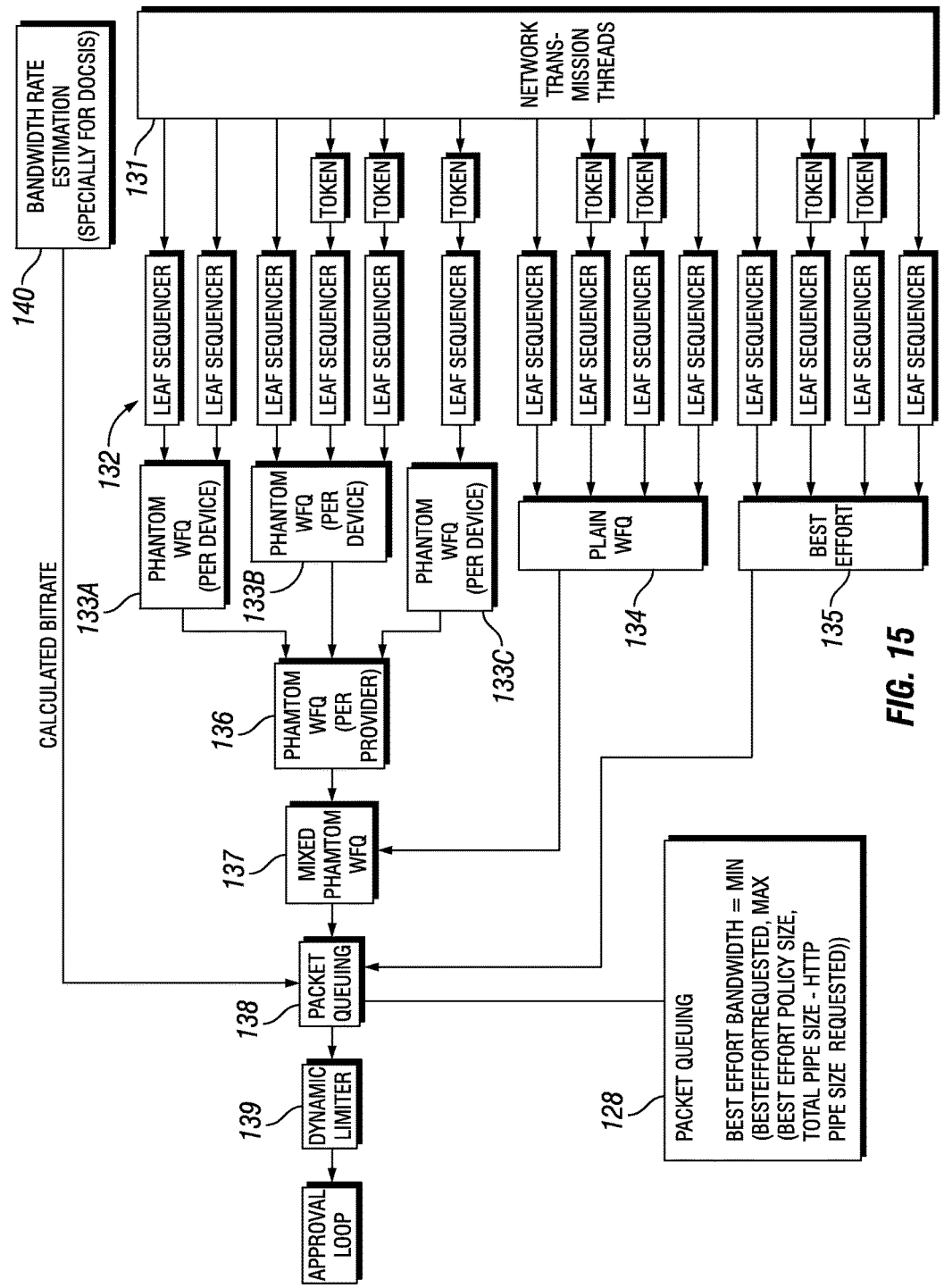
FIG. 15 shows an example of mixed HTTP ABR/non-ABR Managed and Non-HTTP Best Effort bandwidth management.

FIG. 15 shows an example of mixed http ABR/non-ABR Managed and Non-http Best Effort bandwidth management utilizing mixed nested virtual pipes. Looking from the right to the left, from NTTs 131, an ABR identified traffic flow travels through leaf sequencers 132 into a number of Phantom WFQ processing flows 133a-133c, one per OTT provider for each of the active ABR sessions. In addition, a non-ABR http traffic flow travels through leaf sequencers 132 into the plain WFQ processing flow 134. If the content is not http traffic, it travels through leaf sequencers 132 into the best effort processing flow 135.

The output for each of the Phantom ABR optimized WFQ process flows 133a-133c feeds into a Phantom WFQ per provider flow 136. This type of nesting enables the generation of a WFQ-controlled virtual pipe per provider where control of the bandwidth in each pipe is based on a defined pipe priority/weight. Moving to the left, both the output from the plain WFQ processing flow 134 and the phantom WFQ per provider flow 136 feeds into a mixed Phantom WFQ processing flow 137. The mixed phantom WFQ processing flow allows for the non-ABR traffic to use unused bandwidth from the ABR delivery virtual pipe as a result of the ABR clients sleep and wake duty cycles. This provides the optimal in http bandwidth management and ABR video QoE for both ABR and non-ABR http traffic.

The final stage in the processing in the nested pipes is to manage the bandwidth limits and sharing for the non-http traffic. This may be done by a simple means referred to in this disclosure as "Chris's packet queuing" (CPQ). The http traffic from the mixed phantom WFQ processing flow 137 and the non-http traffic from the best effort processing flow 135 is fed into a CPQ algorithm 138, which confines all of the traffic to fit in the outermost pipe. The CPQ algorithm may take the form:

Best Effort Bandwidth=min(BestEffortRequested,
max(BestEffortPolicySize,total pipe size−http
pipe size requested))

This provides for bandwidth usage across the two outermost inner pipes. It allows these two pipes to share bandwidth that is not being used. If there is no non-http traffic, the http traffic pipe can use the entire amount of bandwidth in the Internet (outermost) virtual pipe. Also, if there is no http traffic, the non-http pipe can use all of the bandwidth in the Internet (outermost) virtual pipe. Following the CPQ algorithm 138, packets go through a dynamic rate limiter 139 enroute to the approval loop.

The CPQ algorithm 138 also receives a calculated bitrate from a bandwidth rate estimation module 140 (specifically for DOCSIS). The one embodiment for DOCSIS in this disclosure is the bandwidth must be calculated throughout time. DOCSIS allows for up to a set maximum data rate, but that is not guaranteed. In some DOCSIS systems, the maximum data rate may be 50 Mb/s while in others it may be 9 Mb/s. It can be changing regularly based on neighboring usage. This invention must dynamically change the size of the outermost virtual pipe in order to achieve proper bandwidth management in the non-stable connect speed of a DOCSIS network. For DSL networks, based on their differences in architecture, bandwidth is always guaranteed.

Figure 16:
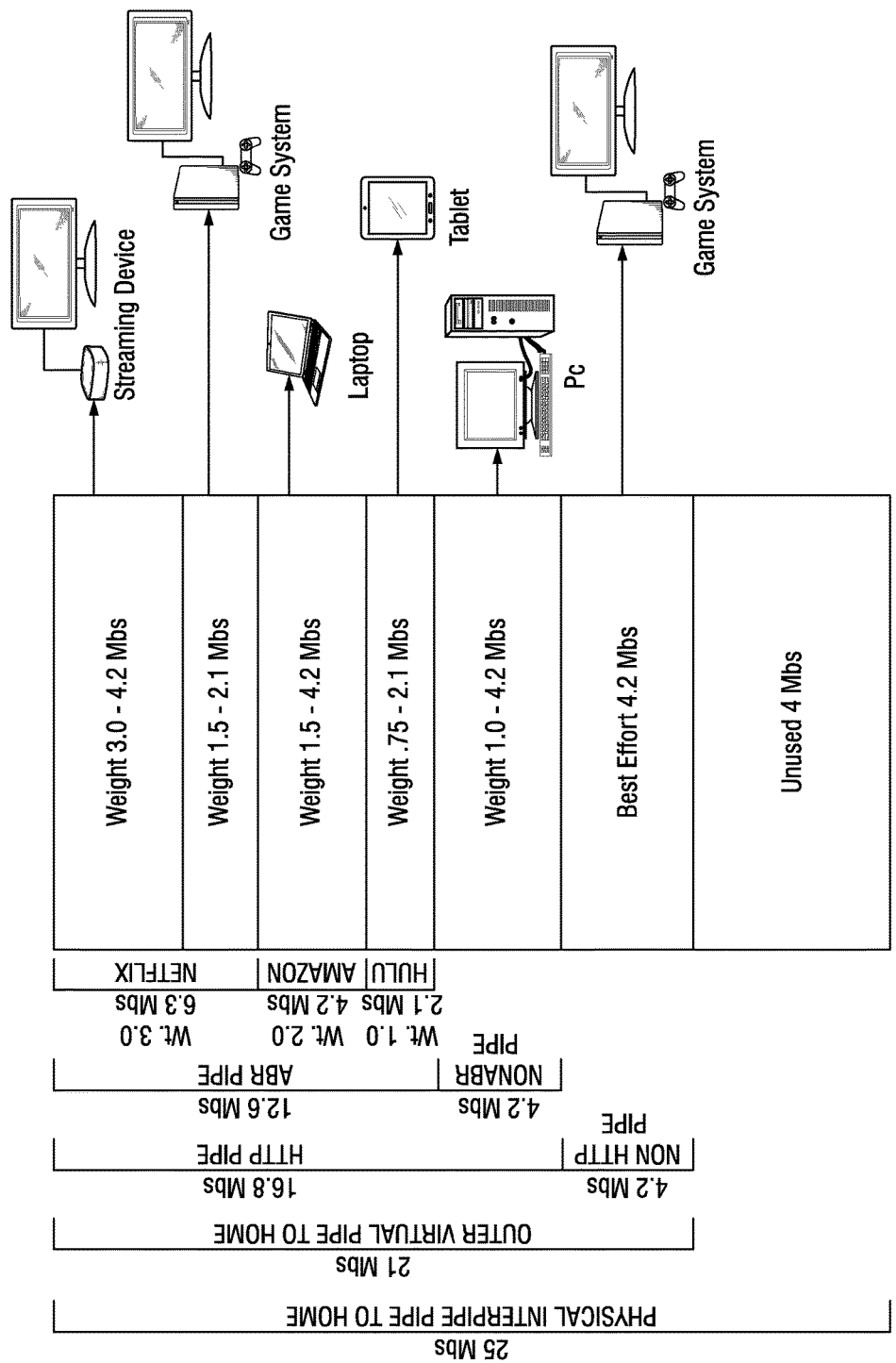
FIG. 16 shows an exemplary allocation of bandwidth across all pipes in a first use-case scenario.

FIG. 16 shows an exemplary allocation of bandwidth across all pipes in a first use-case scenario. In this scenario, there are three OTT providers, two devices watching Netflix, one device watching Amazon Prime, one device watching Hulu, one device using http non-ABR, and one device gaming. It is Day 15 in the billing cycle, and the data rate to stay within the billing cycle data cap has been determined to be 21 Mbs. The outer virtual pipe has been set for this data rate, leaving 4 Mbs of the 25 Mbs physical Internet pipe unused.

The outer virtual pipe includes the dynamic virtual pipes (the HTTP pipe and the non-HTTP pipe) where minimum sizes are bound by policy. Furthermore, the HTTP pipe includes the ABR pipe and the non-ABR pipe. Within the ABR pipe are dynamic virtual pipes for each of the OTT providers (e.g., Netflix, Amazon Prime, and Hulu), where bandwidth pipe size is managed by weights.

Figure 17:
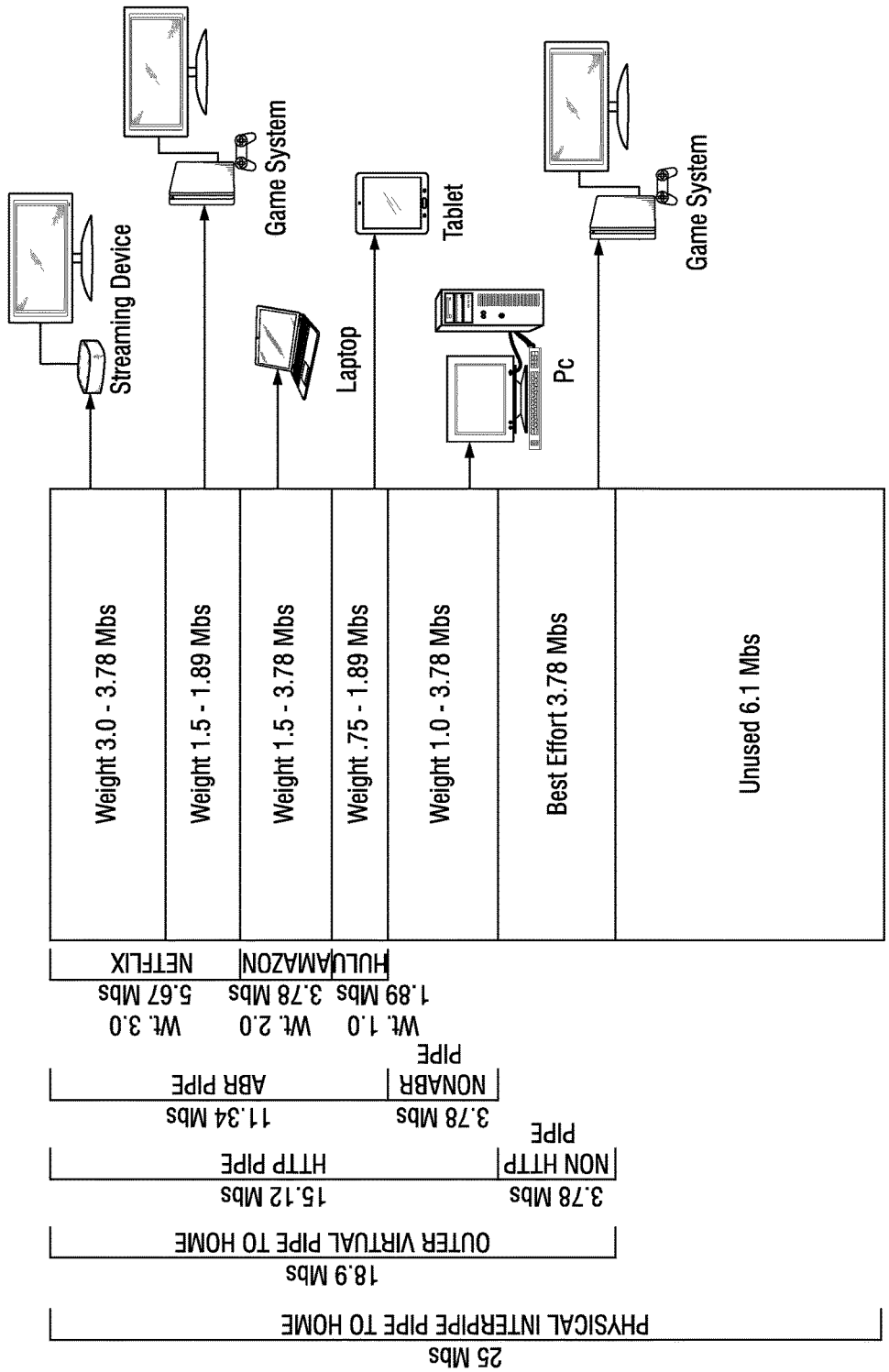
FIG. 17 shows an exemplary allocation of bandwidth across all pipes in a second use-case scenario.

FIG. 17 shows an exemplary allocation of bandwidth across all pipes in a second use-case scenario. In this scenario, there are three OTT providers, two devices watching Netflix, one device watching Amazon Prime, one device watching Hulu, one device using http non-ABR, and one device gaming. It is Day 29 in the billing cycle, and the data rate to stay within the billing cycle data cap has been determined to be 18.9 Mbs. The outer virtual pipe has been set for this data rate, leaving 6.1 Mbs of the 25 Mbs physical Internet pipe unused.

The outer virtual pipe includes the dynamic virtual pipes, the HTTP pipe and the non-HTTP pipe, where minimum sizes are bound by policy. Furthermore, the HTTP pipe includes the ABR pipe and the non-ABR pipe. Within the ABR pipe are dynamic virtual pipes for each of the OTT providers (e.g., Netflix, Amazon Prime, and Hulu), where bandwidth pipe size is managed by weights.

Figure 18:
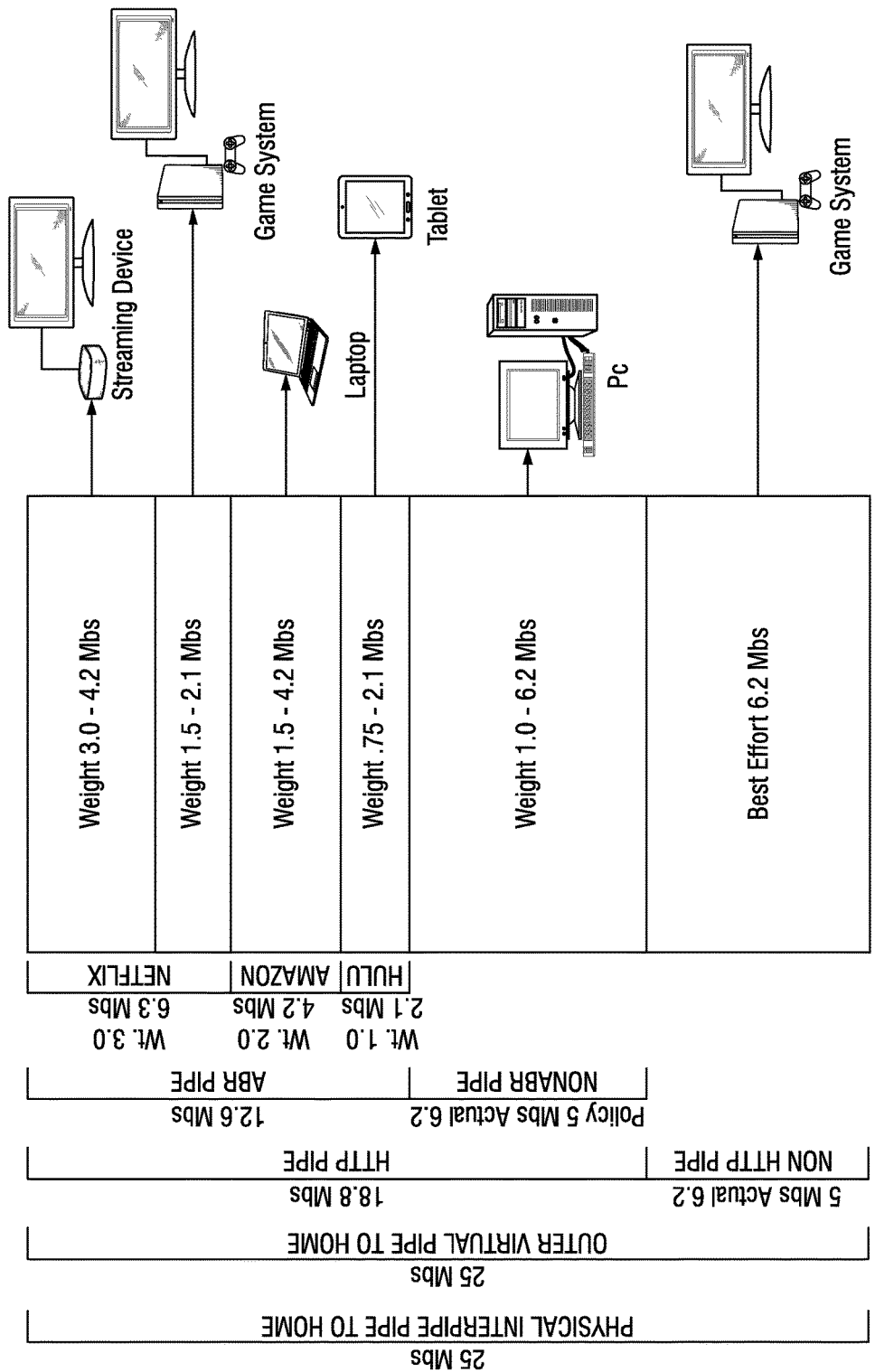
FIG. 18 shows an exemplary allocation of bandwidth across all pipes in a third use-case scenario.

FIG. 18 shows an exemplary allocation of bandwidth across all pipes in a third use-case scenario. In this scenario, there are three OTT providers, two devices watching Netflix, one device watching Amazon Prime, one device watching Hulu, one device using http non-ABR, and one device gaming. It is Day 21 in the billing cycle, and the data rate to stay within the billing cycle data cap has been determined to be 21 Mbs. However, policy has been set to throttling the ABR pipe only. Thus, the outer virtual pipe has been set to match the 25 Mbs physical Internet pipe.

The outer virtual pipe includes the dynamic virtual pipes, the HTTP pipe and the non-HTTP pipe, where minimum sizes are bound by policy. Furthermore, the HTTP pipe includes the ABR pipe and the non-ABR pipe. Within the ABR pipe are dynamic virtual pipes for each of the OTT providers (e.g., Netflix, Amazon Prime, and Hulu), where bandwidth pipe size is managed by weights.

Figure 19:
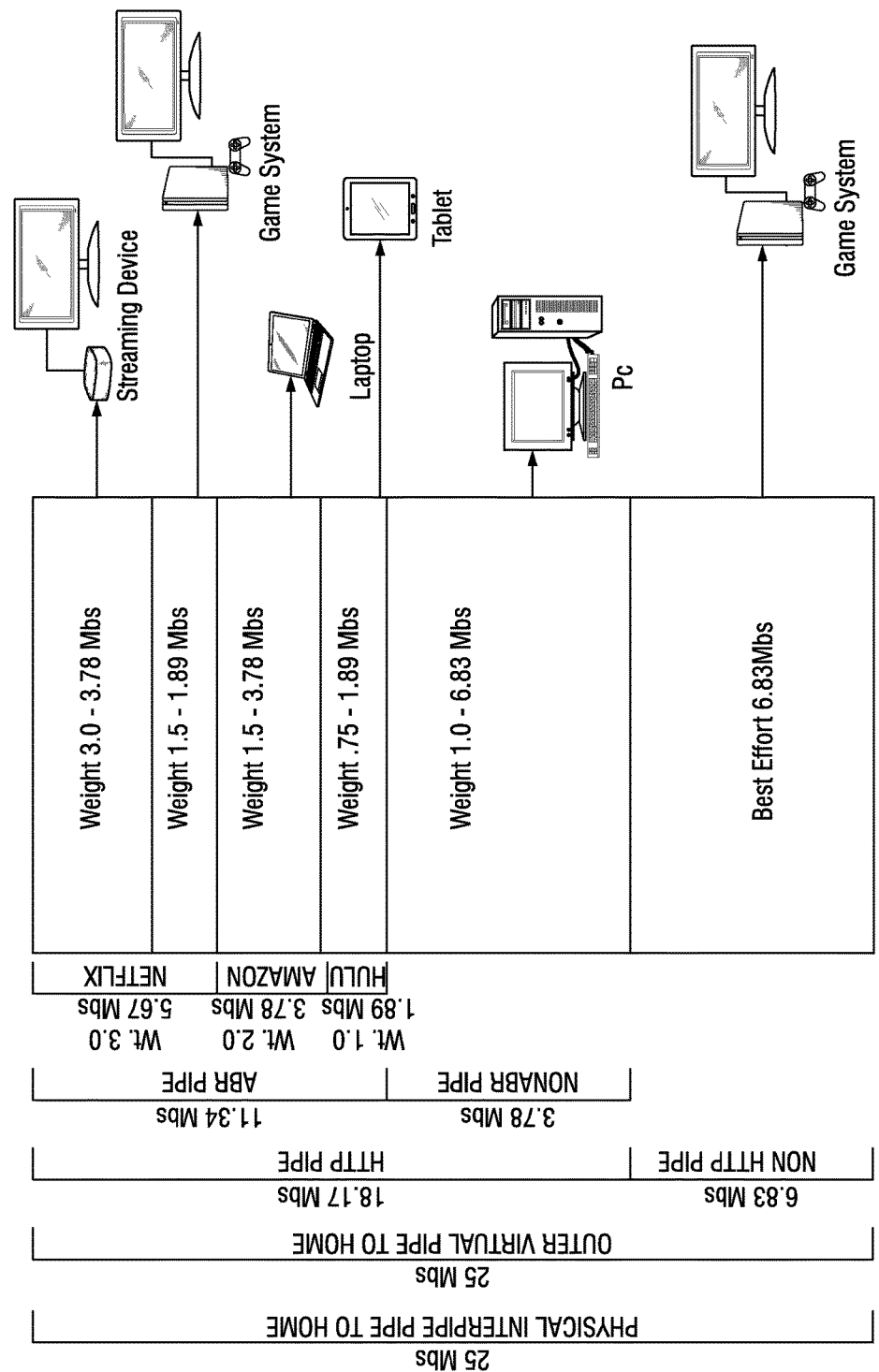
FIG. 19 shows an exemplary allocation of bandwidth across all pipes in a fourth use-case scenario.

FIG. 19 shows an exemplary allocation of bandwidth across all pipes in a fourth use-case scenario. In this scenario, there are three OTT providers, two devices watching Netflix, one device watching Amazon Prime, one device watching Hulu, one device using http non-ABR, and one device gaming. It is Day 29 in the billing cycle, and the data rate to stay within the billing cycle data cap has been determined to be 18.9 Mbs. However, policy has been set to throttling the ABR pipe only. Thus, the outer virtual pipe has been set to match the 25 Mbs physical Internet pipe.

The outer virtual pipe includes the dynamic virtual pipes, the HTTP pipe and the non-HTTP pipe, where minimum sizes are bound by policy. Furthermore, the HTTP pipe includes the ABR pipe and the non-ABR pipe. Within the ABR pipe are dynamic virtual pipes for each of the OTT providers (e.g., Netflix, Amazon Prime, and Hulu), where bandwidth pipe size is managed by weights.

Figure 20:
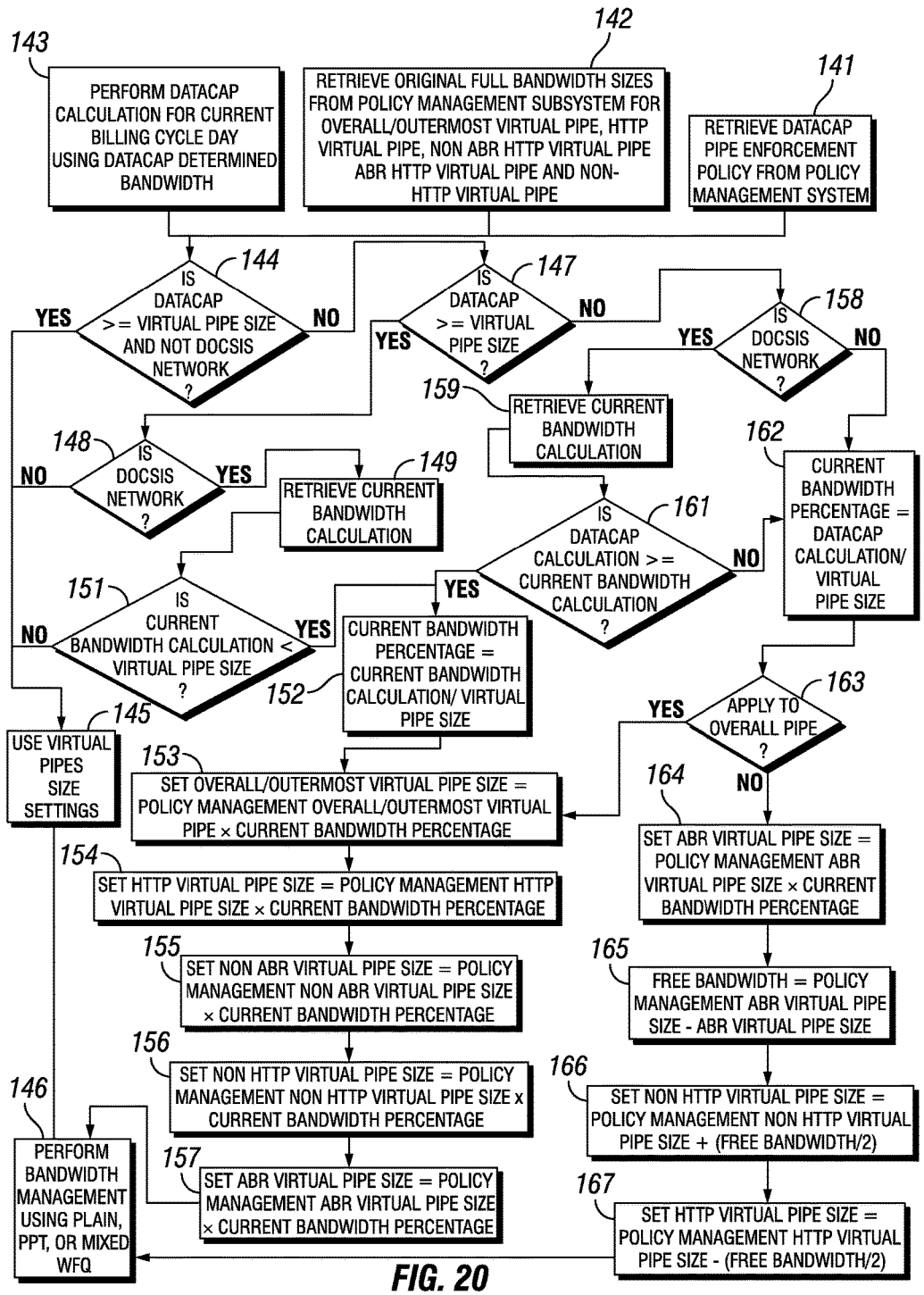
FIG. 20 is a flow chart of a method of data cap controlled bandwidth distribution for QoE management based on OTT video providers and client devices in accordance with an exemplary embodiment of the present disclosure.

FIG. 20 is a flow chart of a method of data cap controlled bandwidth distribution for QoE management based on OTT video providers and client devices in accordance with an exemplary embodiment of the present disclosure. In this example, the datacap limiting calculation is used to manage the size of the outer virtual pipe. The outer virtual pipe may be the same size as the physical data pipe; however, when datacap management is being enforced, the outer virtual pipe is sized such that 0<outer virtual pipe size<=physical data pipe size. Of course, the size of the outer virtual pipe dynamically changes based on the data usage over time throughout the billing cycle.

It is possible to perform an additional calculation and only change the ABR pipe size; however, in this case, since all flows are managed in the pipe with the exception of the other traffic, it is simpler to adjust the outermost pipe. All inner pipes are proportionally resized, and the flows are managed based on the policies and methods set forth above. These are handled dynamically and automatically based on the outer virtual pipe changing size as determined by the datacap calculations.

Referring to FIG. 20, the ABR QoE Management Unit 10 first performs three preliminary steps. At step 141, the unit retrieves Datacap pipe enforcement policy from the Policy Management unit 23. At step 142, the unit retrieves original full bandwidth sizes from the Policy Management unit for the overall/outermost virtual pipe, the HTTP virtual pipe, the non-ABR HTTP virtual pipe, the ABR HTTP virtual pipe, and the non-HTTP virtual pipe. At step 143, the unit performs a Datacap bandwidth calculation for the current billing cycle day using a model such as that shown in FIG. 8.

At decision block 144, it is determined whether the calculated Datacap bandwidth is greater than or equal to the virtual pipe size and the network is not a DOCSIS network. If yes, the method moves to step 145 where the ABR QoE Management Unit 10 uses the virtual pipe size settings. The method then moves to step 146 where the unit performs bandwidth management using plain, PPT, or mixed WFQ as described above. However, if it is determined at step 144 that the calculated Datacap bandwidth is less than the virtual pipe size or that the network is a DOCSIS network, the method moves to step 147 where it is determined whether the calculated Datacap bandwidth is greater than or equal to the virtual pipe size. If the calculated Datacap bandwidth is greater than or equal to the virtual pipe size, the method moves to step 148 where it is determined whether the network is a DOCSIS network. If not, the method performs steps 145 and 146. However, if the network is a DOCSIS network, the method moves to step 149 where the unit retrieves the current bandwidth calculation.

At step 151, it is determined whether the current bandwidth calculation is less than the virtual pipe size. If not, the method performs steps 145 and 146. However, if the current bandwidth calculation is greater than or equal to the virtual pipe size, the method moves to step 152 where the current bandwidth percentage is calculated as the current bandwidth calculation divided by the virtual pipe size. At step 153, the unit sets the overall/outermost virtual pipe size equal to the Policy Management overall outermost virtual pipe size times the current bandwidth percentage. At step 154 the unit sets the HTTP virtual pipe size equal to the Policy Management HTTP virtual pipe size times the current bandwidth percentage. At step 155, the unit sets the non-ABR virtual pipe size equal to the Policy Management non-ABR virtual pipe size times the current bandwidth percentage. At step 156, the unit sets the non-HTTP virtual pipe size equal to the Policy Management non-HTTP virtual pipe size times the current bandwidth percentage. At step 157, the unit sets the ABR virtual pipe size equal to the Policy Management ABR virtual pipe size times the current bandwidth percentage. The method then moves to step 146 where the unit performs bandwidth management using plain, PPT, or mixed WFQ as described above.

Returning to step 147, if it is determined that the calculated Datacap bandwidth is less than the virtual pipe size, the method moves to step 158 where it is again determined whether the network is a DOCSIS network. If so, the method moves to step 159 where the ABR QoE Management Unit 10 retrieves the current bandwidth calculation. At step 161, it is determined whether the Datacap calculation is greater than or equal to the current bandwidth calculation. If so, the method performs steps 152-157 and step 146. However, if it is determined at step 161 that the Datacap calculation is less than the current bandwidth calculation, the method moves to step 162 where the unit sets the current bandwidth percentage equal to the Datacap calculation divided by the virtual pipe size. At step 163 it is decided whether the current bandwidth percentage is to be applied to the overall pipe. If so, the method performs steps 153-157 and step 146. However, if it is determined at step 163 that the current bandwidth percentage is not to be applied to the overall pipe, the method moves to step 164 with the unit sets the ABR virtual pipe size equal to the Policy Management ABR virtual pipe size times the current bandwidth percentage. At step 165, the unit calculates free bandwidth as being equal to the Policy Management ABR virtual pipe size minus the ABR virtual pipe size. At step 166, the unit sets the non-HTTP virtual pipe size equal to the Policy Management non-HTTP virtual pipe size plus the quantity of the free bandwidth divided by 2. At step 167, the unit sets the HTTP virtual pipe size equal to the Policy Management HTTP virtual pipe size minus the quantity of the free bandwidth divided by 2. It should be noted that there is no need to set the non-ABR pipe size under these conditions because the bandwidth management algorithms defined above allocate the non-ABR bandwidth correctly based on the outer HTTP pipe resize.

In the above manner, the disclosed system provides for a greatly improved ability to manage bandwidth used in a fixed network pipe to a home with a focus on the ability to manage QoE across OTT providers as well as multiple devices watching content.

One or more embodiments of the present patent disclosure may be implemented using different combinations of software and firmware and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), and the like. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method in a computer-controlled Adaptive Bitrate (ABR) Quality of Experience (QoE) Management Unit for managing bandwidth usage and QoE at a customer premises where multiple client devices independently download content from multiple providers, the method comprising:
   determining a data cap for a current billing cycle day;
   determining, based on policy management settings and the data cap for the current billing cycle day, at least one of:
      a premises bandwidth cap for an overall virtual pipe to the premises, the overall virtual pipe including a Hypertext Transfer Protocol (HTTP) inner pipe, a non-HTTP inner pipe, an ABR inner pipe, and a non-ABR inner pipe;
      an HTTP bandwidth cap for the HTTP inner pipe;
      a non-HTTP bandwidth cap for the non-HTTP inner pipe;
      an ABR bandwidth cap for the ABR inner pipe; and
      a non-ABR bandwidth cap for the non-ABR inner pipe; and
   responsive to the determination of the bandwidth caps, throttling traffic within at least one of the inner pipes.

2. The method according to claim 1, further comprising:
   predicting future data usage at the customer premises for the current billing cycle;
   monitoring all actual data usage at the premises; and
   dynamically adjusting the bandwidth caps throughout the current billing cycle, using the predicted future data usage as an input, to smoothly keep actual total data usage for the current billing cycle from exceeding a billing cycle data cap for the current billing cycle before the current billing cycle ends.

3. The method according to claim 2, wherein predicting future data usage includes:
   generating a linear regression model for future data usage at the customer premises based on past data usage at the premises, wherein the linear regression model utilizes a least square method; and
   dynamically updating the linear regression model by recalculating coefficients as more recent data usage information becomes available.

4. The method according to claim 2, wherein predicting future data usage includes generating a historical model for data usage at the customer premises based on historical data usage patterns at the premises during past billing cycles.

5. The method according to claim 4, further comprising:
   throttling only ABR data streams to maintain a current premises bitrate within the premises bandwidth cap, wherein throttling includes:
      generating a value, $\alpha$, equal to the time in the billing cycle ($t_m$) divided by the time spent consuming video ($t_c$) based on the historical data usage patterns at the premises during past billing cycles;
      calculating, for the sum of all ABR data streams entering the premises, an allowed data rate (ABR_Rate) by multiplying $\alpha$ by the data remaining within the data cap divided by the days remaining in the current billing cycle; and
      setting a bitrate limit for each ABR data stream based on the ABR_Rate and the number of ABR data streams.

6. The method according to claim 1, further comprising maintaining a desired QoE for each client device/provider combination by:
   assigning a priority level to each provider and to each client device;
   translating the assigned priority levels into weights; and
   utilizing the weights in a Weighted Fair Queuing (WFQ) algorithm to control, at any given time, an amount of bandwidth each client device is allowed to utilize to download content from any given provider, thereby maintaining a desired QoE for each client device/provider combination.

7. The method according to claim 6, wherein utilizing the weights in a WFQ algorithm includes utilizing Phantom Packet Transmission (PPT) WFQ to prevent a first client device from increasing its bit rate when a second client device is in an idle phase of its duty cycle due to a full buffer.

8. The method according to claim 7, wherein utilizing PPT WFQ includes:
   detecting that the second client device has entered the idle phase of its duty cycle; and
   generating phantom packets that are not associated with any actual payload traffic, wherein the phantom packets simulate a continuous network demand by the second client device while the second client device is in the idle phase of its duty cycle, thereby preventing the first client device from increasing its bit rate.

9. The method according to claim 8, wherein utilizing PPT WFQ also includes:
   selecting packets for transmission to the client devices;
   when a real packet containing actual payload traffic for an associated client device is selected for transmission, transmitting the selected real packet to the associated client device; and
   when a phantom packet is selected for transmission, transmitting a replacement real packet to a client device that is utilizing a data stream that does not exhibit a duty cycle.

10. An Adaptive Bitrate (ABR) Quality of Experience (QoE) Management Unit for managing bandwidth usage and QoE at a customer premises where multiple client devices independently download content from multiple providers, the ABR QoE Management Unit comprising:
   at least one microprocessor;
   a non-transitory computer-readable medium coupled to the at least one microprocessor configured to store computer-readable instructions, wherein when the instructions are executed by the at least one microprocessor, the ABR QoE Management Unit is caused to:
   determine a data cap for a current billing cycle day;
   determine, based on policy management settings and the data cap for the current billing cycle day, at least one of:
      a premises bandwidth cap for an overall virtual pipe to the premises, the overall virtual pipe including a Hypertext Transfer Protocol (HTTP) inner pipe, a non-HTTP inner pipe, an ABR inner pipe, and a non-ABR inner pipe;
      an HTTP bandwidth cap for the HTTP inner pipe;
      a non-HTTP bandwidth cap for the non-HTTP inner pipe;
      an ABR bandwidth cap for the ABR inner pipe; and
      a non-ABR bandwidth cap for the non-ABR inner pipe; and responsive to the determination of the bandwidth caps, throttle traffic within at least one of the inner pipes.

11. The ABR QoE Management Unit according to claim 10, wherein the Management Unit is configured to:
predict future data usage at the customer premises for the current billing cycle;
monitor all actual data usage at the premises; and
dynamically adjust the bandwidth caps throughout the current billing cycle, using the predicted future data usage as an input, to smoothly keep actual total data usage for the current billing cycle from exceeding a billing cycle data cap for the current billing cycle before the current billing cycle ends.

12. The ABR QoE Management Unit according to claim 11, wherein the Management Unit is configured to predict future data usage by:
generating a linear regression model for future data usage at the customer premises based on past data usage at the premises, wherein the linear regression model utilizes a least square method; and
dynamically updating the linear regression model by recalculating coefficients as more recent data usage information becomes available.

13. The ABR QoE Management Unit according to claim 11, wherein predicting future data usage includes generating a historical model for data usage at the customer premises based on historical data usage patterns at the premises during past billing cycles.

14. The ABR QoE Management Unit according to claim 13, further comprising:
throttling only ABR data streams to maintain a current premises bitrate within the premises bandwidth cap, wherein throttling includes:
generating a value, $\alpha$, equal to the time in the billing cycle ($t_m$) divided by the time spent consuming video ($t_c$) based on the historical data usage patterns at the premises during past billing cycles;
calculating, for the sum of all ABR data streams entering the premises, an allowed data rate (ABR_Rate) by multiplying $\alpha$ by the data remaining within the data cap divided by the days remaining in the current billing cycle; and
setting a bitrate limit for each ABR data stream based on the ABR_Rate and the number of ABR data streams.

15. The ABR QoE Management Unit according to claim 10, further comprising maintaining a desired QoE for each client device/provider combination by:
assigning a priority level to each provider and to each client device;
translating the assigned priority levels into weights; and
utilizing the weights in a Weighted Fair Queuing (WFQ) algorithm to control, at any given time, an amount of bandwidth each client device is allowed to utilize to download content from any given provider, thereby maintaining a desired QoE for each client device/provider combination.

16. The ABR QoE Management Unit according to claim 15, wherein utilizing the WFQ algorithm includes utilizing Phantom Packet Transmission (PPT) WFQ to prevent a first client device from increasing its bit rate when a second client device is in an idle phase of its duty cycle due to a full buffer.

17. The ABR QoE Management Unit according to claim 16, wherein utilizing PPT WFQ includes:
detecting that the second client device has entered the idle phase of its duty cycle; and
generating phantom packets that are not associated with any actual payload traffic, wherein the phantom packets simulate a continuous network demand by the second client device while the second client device is in the idle phase of its duty cycle, thereby preventing the first client device from increasing its bit rate.

18. The ABR QoE Management Unit according to claim 17, wherein utilizing PPT WFQ also includes:
selecting packets for transmission to the client devices;
when a real packet containing actual payload traffic for an associated client device is selected for transmission, transmitting the selected real packet to the associated client device; and
when a phantom packet is selected for transmission, transmitting a replacement real packet to a client device that is utilizing a data stream that does not exhibit a duty cycle.

19. A computer program product comprising instructions stored on non-transient computer-readable medium which, when executed by a processor, cause an Adaptive Bitrate (ABR) Quality of Experience (QoE) Management Unit to manage bandwidth usage and QoE at a customer premises where multiple client devices independently download content from multiple providers, by performing the acts of:
determining a data cap for a current billing cycle day;
determining, based on policy management settings and the data cap for the current billing cycle day, at least one of:
a premises bandwidth cap for an overall virtual pipe to the premises, the overall virtual pipe including a Hypertext Transfer Protocol (HTTP) inner pipe, a non-HTTP inner pipe, an ABR inner pipe, and a non-ABR inner pipe;
an HTTP bandwidth cap for the HTTP inner pipe;
a non-HTTP bandwidth cap for the non-HTTP inner pipe;
an ABR bandwidth cap for the ABR inner pipe; and
a non-ABR bandwidth cap for the non-ABR inner pipe; and
responsive to the determination of the bandwidth caps, throttling traffic within at least one of the inner pipes.

20. The computer program product according to claim 19, wherein the computer program product also causes the ABR QoE Management Unit to perform the acts of:
predicting future data usage at the customer premises for the current billing cycle;
monitoring all actual data usage at the premises; and
dynamically adjusting the bandwidth caps throughout the current billing cycle, using the predicted future data usage as an input, to smoothly keep actual total data usage for the current billing cycle from exceeding a billing cycle data cap for the current billing cycle before the current billing cycle ends.

* * * * *